United States Patent
Liu et al.

(10) Patent No.: US 7,984,787 B2
(45) Date of Patent: Jul. 26, 2011

(54) FLUID-CARRYING CONDUIT AND METHOD WITH NOISE ATTENUATION

(75) Inventors: Zheji Liu, Olean, NY (US); Mark Joseph Kuzdzal, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 25 days.

(21) Appl. No.: 12/358,705

(22) Filed: Jan. 23, 2009

(65) Prior Publication Data

US 2010/0187038 A1    Jul. 29, 2010

(51) Int. Cl.
- *E04B 1/82* (2006.01)
- *F02K 1/00* (2006.01)
- *F04D 27/02* (2006.01)
- *F16K 47/02* (2006.01)

(52) U.S. Cl. ........ 181/233; 181/213; 181/286; 181/290; 415/1

(58) Field of Classification Search .................. 181/233, 181/210, 286, 290, 213; 415/1
See application file for complete search history.

(56) References Cited

U.S. PATENT DOCUMENTS

| | | | | |
|---|---|---|---|---|
| 4,185,664 A | * | 1/1980 | Zabsky et al. | 138/40 |
| 4,314,621 A | * | 2/1982 | Hansen | 181/233 |
| 4,854,416 A | * | 8/1989 | Lalikos et al. | 181/207 |
| 5,400,825 A | * | 3/1995 | Gethmann et al. | 137/625.32 |
| 5,447,413 A | | 9/1995 | Maier et al. | |
| 5,539,164 A | * | 7/1996 | van Ruiten | 181/233 |
| 5,613,649 A | * | 3/1997 | Schlinker et al. | 244/1 N |
| 6,116,375 A | * | 9/2000 | Lorch et al. | 181/224 |
| 6,550,574 B2 | * | 4/2003 | Liu | 181/286 |
| 6,601,672 B2 | * | 8/2003 | Liu | 181/290 |
| 6,669,436 B2 | * | 12/2003 | Liu | 415/1 |
| 6,854,269 B2 | * | 2/2005 | Hale | 60/417 |
| 6,918,740 B2 | * | 7/2005 | Liu | 415/1 |
| 7,021,420 B2 | | 4/2006 | Galaitsis | |
| 7,080,514 B2 | * | 7/2006 | Bland et al. | 60/725 |
| 7,345,594 B2 | * | 3/2008 | Huang et al. | 340/854.3 |
| 2005/0076668 A1 | | 4/2005 | Choi | |
| 2006/0225944 A1 | * | 10/2006 | Abner et al. | 180/417 |
| 2010/0189546 A1 | * | 7/2010 | Liu et al. | 415/119 |

OTHER PUBLICATIONS

Liu, Z., and Hill, D.L., "Centrifugal Compressor Noise Reduction by Using Helmholtz Resonator Arrays;" Proceedings of the 30th Turbomachinery Symposium, Sep. 17-20, 2001, pp. 89-94; The Laboratory.

Liu, Z., Jahnke, W., Marczak, M., and Kiteck, P., "Reducing Compressor Station Ambient Noise Level by Controlling Compressor Internal Noise Source;" Proceedings of the International Pipeline Conference 2002; Sep. 29-Oct. 3, 2002; pp. 1131-1141; American Society of Mechanical Engineers.

Liu, Z., Hill, D.L. and Motriuk, R., "On Reducing Piping Vibration Levels—Attacking the Source," Proceedings of ASME Turbo Expo: Land, Sea & Air, Jun. 3-6, 2002; pp. 1103-1109; American Society of Mechanical Engineers.

Liu, Z., and Kuzdzal, Mark J., "Noise Control of an 11,000 horsepower Single Stage Pipeline Centrifugal Compressor," Proceedings of ASME Turbo Expo 2007, May 8-11, 2007; pp. 1489-1496; American Society of Mechanical Engineers.

* cited by examiner

*Primary Examiner* — Elvin G Enad
*Assistant Examiner* — Christina Russell
(74) *Attorney, Agent, or Firm* — Edmonds & Nolte, PC

(57) ABSTRACT

A device or system through which fluid is adapted to flow, such as, for example, a fluid-carrying conduit, flow control valve, or fluid expansion device including, for example, a steam turbine or fluid expander, according to which acoustic energy is generated by, or present within, the device or system and the acoustic energy is attenuated.

20 Claims, 15 Drawing Sheets

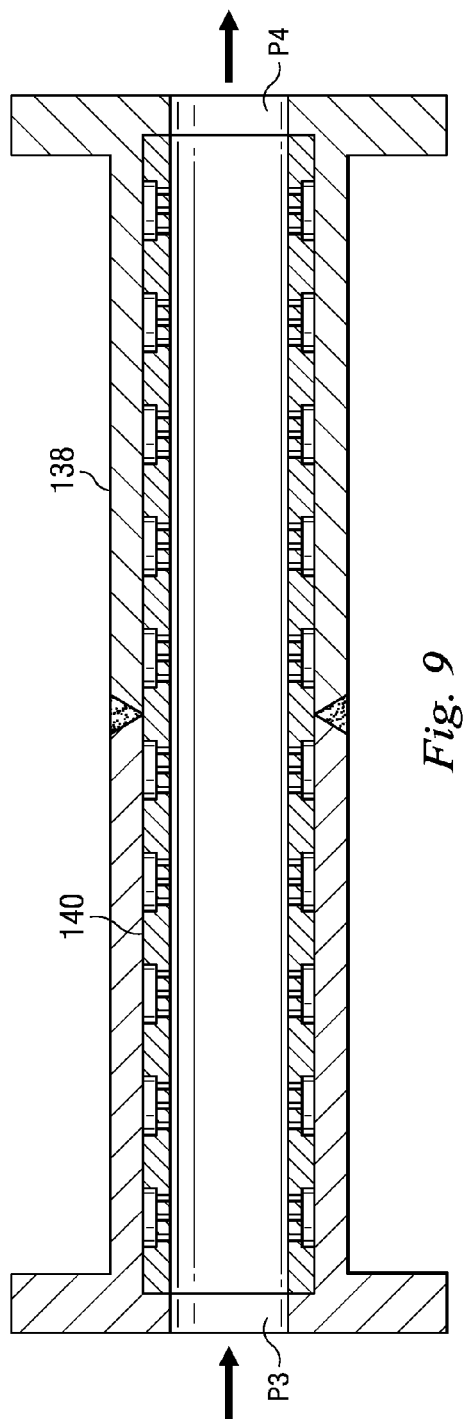
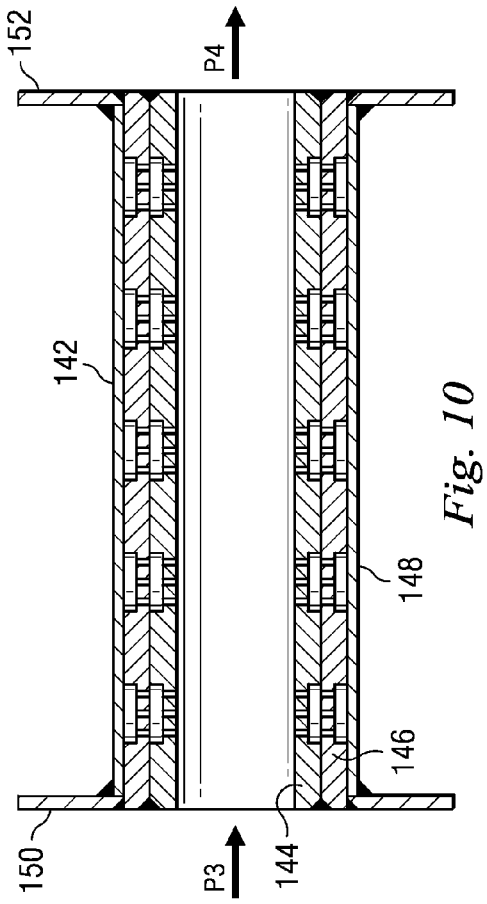

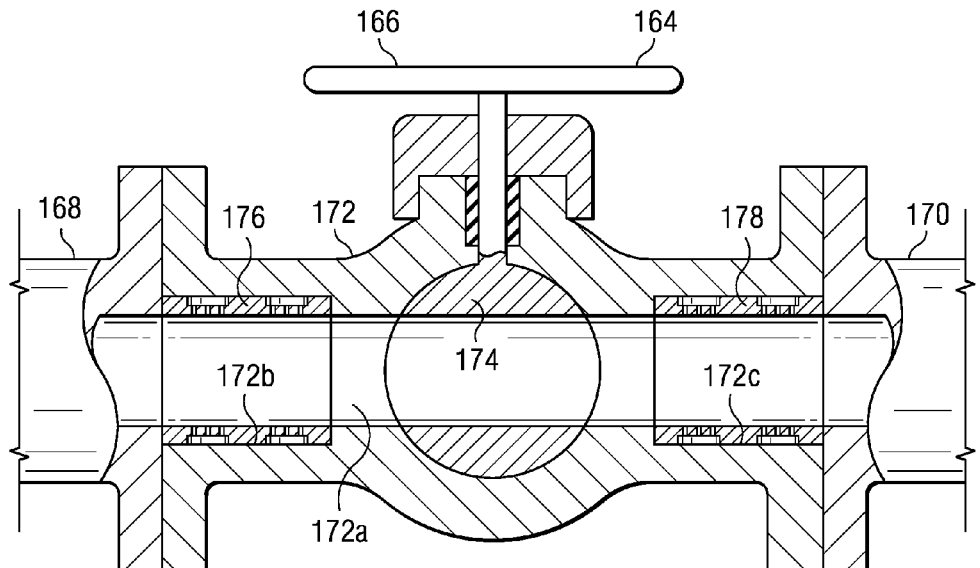
Fig. 13
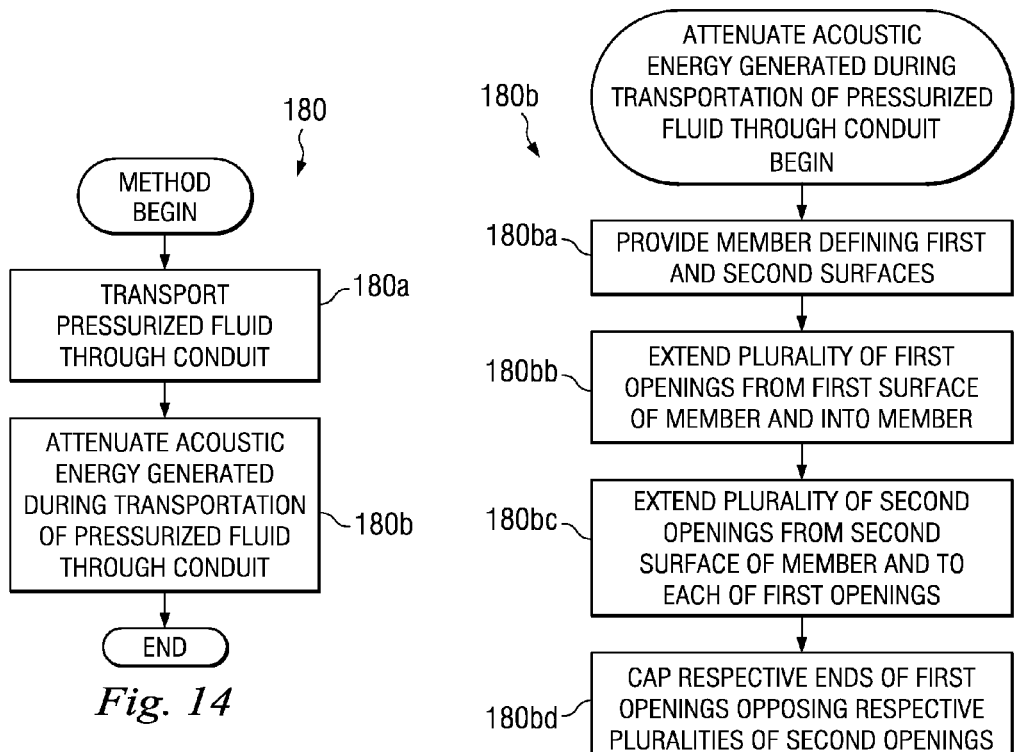
Fig. 14
Fig. 15

FLUID-CARRYING CONDUIT AND METHOD WITH NOISE ATTENUATION

CROSS REFERENCE TO RELATED APPLICATION

This application is related to U.S. patent application Ser. No. 12/358,986, filed on Jan. 23, 1989, the disclosure of which is incorporated herein by reference.

BACKGROUND

The present disclosure relates in general to devices or systems through which fluid is adapted to flow, such as, for example, fluid-carrying conduits, flow control valves, or fluid expansion devices including, for example, steam turbines or fluid expanders, and in particular to devices or systems through which fluid is adapted to flow and in which noise, or acoustic energy, is generated or present, and where it would be desirable to attenuate the acoustic energy. Therefore, the present exemplary embodiments provide, among other things, attenuation of acoustic energy generated and/or present within devices or systems through which fluid is adapted to flow.

SUMMARY

Embodiments of the disclosure may provide a method including transporting pressurized fluid through a conduit; and attenuating acoustic energy generated during transporting the pressurized fluid through the conduit, including providing a first member defining first and second surfaces, and including one of a plate and a curved shell; extending a plurality of first openings from the first surface of the first member and into the first member; extending a plurality of second openings from the second surface of the first member and to each of the first openings; and capping respective ends of the first openings opposing the respective pluralities of second openings. In an exemplary embodiment, the first member includes the curved shell, the curved shell being cylindrical in shape; wherein the first and second surfaces are circumferentially-extending outside and inside surfaces, respectively, defined by the curved shell; wherein the conduit defines a cylindrical inside surface; wherein capping the respective ends of the first openings opposing the respective pluralities of second openings includes abutting the outside surface of the curved shell against the cylindrical inside surface of the conduit.

Embodiments of the disclosure may further provide a system including means for transporting pressurized fluid through a conduit and generating acoustic energy upstream of, within, or downstream of, the conduit during transporting the pressurized fluid through the conduit; and means for attenuating the acoustic energy, including means for providing a first member defining first and second surfaces, and including one of a plate and a curved shell; means for extending a plurality of first openings from the first surface of the first member and into the first member; means for extending a plurality of second openings from the second surface of the first member and to each of the first openings; and means for capping the respective ends of the first openings opposing the respective pluralities of second openings.

Embodiments of the disclosure may further provide a system including a conduit adapted to transport a pressurized fluid, the conduit defining a cylindrical inside surface; and an acoustic liner engaged with the conduit, the acoustic liner including a first cylindrical shell defining an inside surface and an outside surface, the outside surface of the first cylindrical shell abutting the cylindrical inside surface of the conduit; and a plurality of first acoustic resonators, each of the first acoustic resonators including a first opening extending from the outside surface of the first cylindrical shell, and into the first cylindrical shell; and a plurality of second openings, each of the second openings extending from the inside surface of the first cylindrical shell, and to the first opening; wherein the abutment between the outside surface of the first cylindrical shell and the cylindrical inside surface of the conduit caps the respective ends of the first openings opposing the respective pluralities of the second openings; and wherein one or more of the first acoustic resonators attenuate acoustic energy generated during the transport of the pressurized fluid by the conduit.

Embodiments of the disclosure may further provide a system including a conduit for transporting pressurized fluid; and a noise-attenuating array engaged with the conduit.

Embodiments of the disclosure may further provide a fluid expansion device into which a fluid is adapted to enter at a first pressure, through which the fluid is adapted to flow, and from which the fluid is adapted to exit at a second pressure that is less than the first pressure, the fluid expansion device including a stationary first member; a stationary second member defining first and second surfaces and including at least one of a ring, a curved shell, and a plate, the first member abutting the first surface of the second member; a plurality of first acoustic resonators, each of the first acoustic resonators including a first opening extending from the first surface defined by the second member, and into the second member; and a plurality of second openings, each of the second openings extending from the second surface, and to the first opening; the first member capping the end of the first opening opposing the second openings; wherein one or more of the first acoustic resonators attenuate acoustic energy generated during the flow of the fluid.

Embodiments of the disclosure may further provide a method including providing a fluid expansion device; introducing a fluid into the fluid expansion device; expanding the fluid using the fluid expansion device after introducing the fluid into the fluid expansion device; generating acoustic energy during expanding the fluid; and attenuating the acoustic energy generated during expanding the fluid, including providing a first member defining first and second surfaces; extending a plurality of first openings from the first surface of the first member and into the first member; extending a plurality of second openings from the second surface of the first member and to each of the first openings; and capping the respective ends of the first openings opposing the respective pluralities of second openings with a surface defined by fluid expansion device.

Embodiments of the disclosure may further provide a system including means for providing a fluid expansion device; means for introducing a fluid into the fluid expansion device; means for expanding the fluid using the fluid expansion device after introducing the fluid into the fluid expansion device; means for generating acoustic energy during expanding the fluid; and means for attenuating the acoustic energy generated during expanding the fluid, including means for providing a first member defining first and second surfaces; means for extending a plurality of first openings from the first surface of the first member and into the first member; means for extending a plurality of second openings from the second surface of the first member and to each of the first openings; and means for capping the respective ends of the first openings opposing the respective pluralities of second openings with a surface defined by fluid expansion device.

Embodiments of the present disclosure may further provide a system including a fluid expansion device; and a noise-attenuating array positioned proximate a source of generated noise in the fluid expansion device.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 9 illustrates a sectional view of a fluid-carrying conduit, according to an exemplary embodiment.

FIG. 10 illustrates a sectional view of a fluid-carrying conduit, according to an exemplary embodiment.

FIG. 13 illustrates a partial sectional/partial diagrammatic view of a system according to an exemplary embodiment, the system including a flow device, according to an exemplary embodiment.

FIG. 14 illustrates a flow chart illustration of a method, according to an exemplary embodiment.

FIG. 15 illustrates a flow chart illustration of a step of the method of FIG. 14, according to an exemplary embodiment.

DETAILED DESCRIPTION

Figure 1:
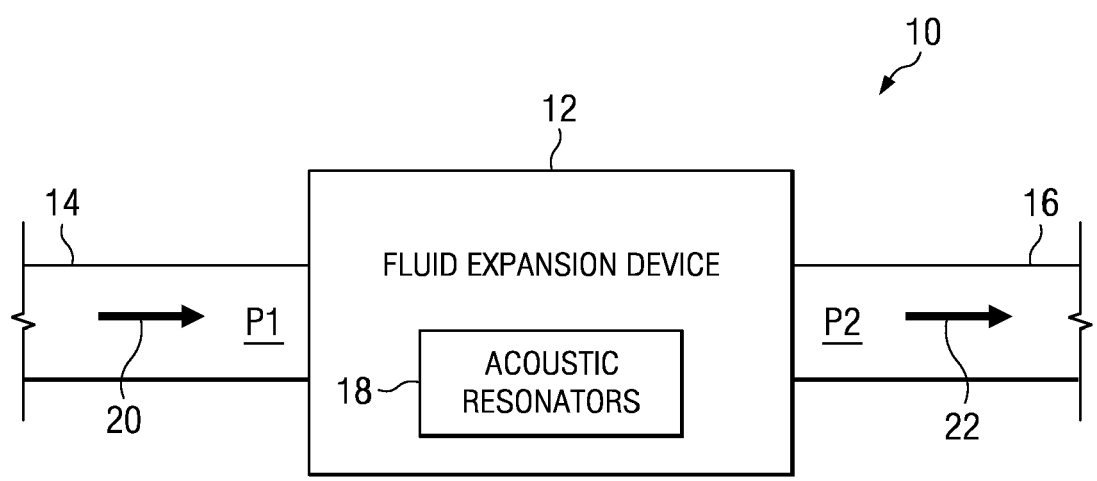
FIG. 1 illustrates a diagram of a system according to an exemplary embodiment, the system including a fluid expansion device and conduit sections, according to respective exemplary embodiments.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

FIG. 1 illustrates, in an exemplary embodiment, a system generally referred to by the reference numeral 10 and including a fluid expansion device 12 positioned between, and coupled to, conduit sections 14 and 16. One or more acoustic resonators 18 are formed in, and/or coupled to, the fluid expansion device 12 and/or one or more components thereof.

In operation, in an exemplary embodiment, the fluid expansion device 12 receives a fluid at a pressure P1 via the conduit section 14, and then expands the fluid, so that the fluid exits the fluid expansion device 12 and enters the conduit section 16 at a pressure P2, which is less than the pressure P1. Arrows 20 and 22 indicate the direction of this fluid flow from the conduit section 14, through the fluid expansion device 12, and into the conduit section 16.

In an exemplary embodiment, during its operation, the fluid expansion device 12 is a noise source, generating acoustic energy, or noise, and producing a noise level. The acoustic resonators 18 attenuate the acoustic energy generated by the operation of the fluid expansion device 12, thereby reducing the noise level produced by the device 12. In several exemplary embodiments, the attenuation of the acoustic energy by the resonators 18 reduces the risk of any structural failure due to vibrations and/or other types of dynamic and/or vibratory loading, within and/or relatively proximate the fluid expansion device 12 and/or the conduit sections 14 and 16. Moreover, the attenuation of acoustic energy by the resonators 18 reduces the risk that one or more of the fluid expansion device 12, the conduit section 14, and the conduit section 16 will become a noise nuisance during the operation of the fluid expansion device 12.

In an exemplary embodiment, as illustrated in FIGS. 2A, 2B, 2C and 2D with continuing reference to FIG. 1, the fluid expansion device 12 is, includes, or is a part of, a steam turbine 24, which includes one or more diaphragms 26, one of which is shown in FIGS. 2A, 2B, 2C and 2D. A rotatable steam turbine wheel 28 (FIG. 2B) is positioned immediately downstream of each of the diaphragms 26. A plurality of blades 30, each of which includes a base 30a and a tip 30b, extend radially outwardly from the each of the turbine wheels 28. The one or more diaphragms 26 and wheels 28, and the blades 30, are housed in a housing or casing (not shown), and the one or more wheels 28 and blades 30 are part of a rotor including a shaft (not shown) from which the one or more wheels 28 extend, which rotor is adapted to rotate in place within the casing of the steam turbine 24, while the one or more diaphragms 26 remain stationary within the casing, under conditions to be described below.

Figure 2A:
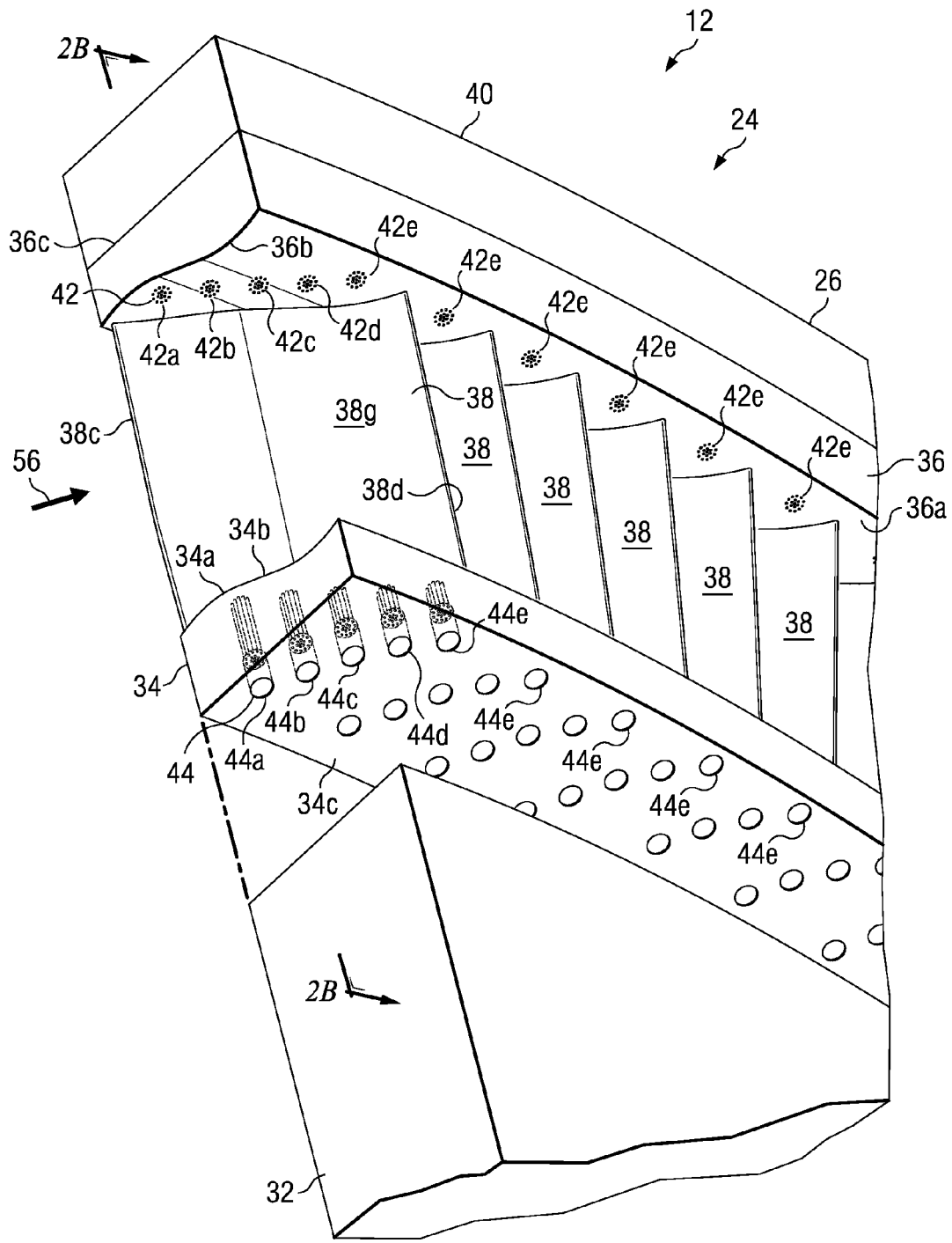
FIG. 2A illustrates a partially exploded perspective view of a portion of a diaphragm of a steam turbine, according to an exemplary embodiment, the steam turbine being, including, or being at least a part of, the fluid expansion device of FIG. 1 and the diaphragm including two pluralities of groups of acoustic resonators, according to respective exemplary embodiments.
Figure 2B:
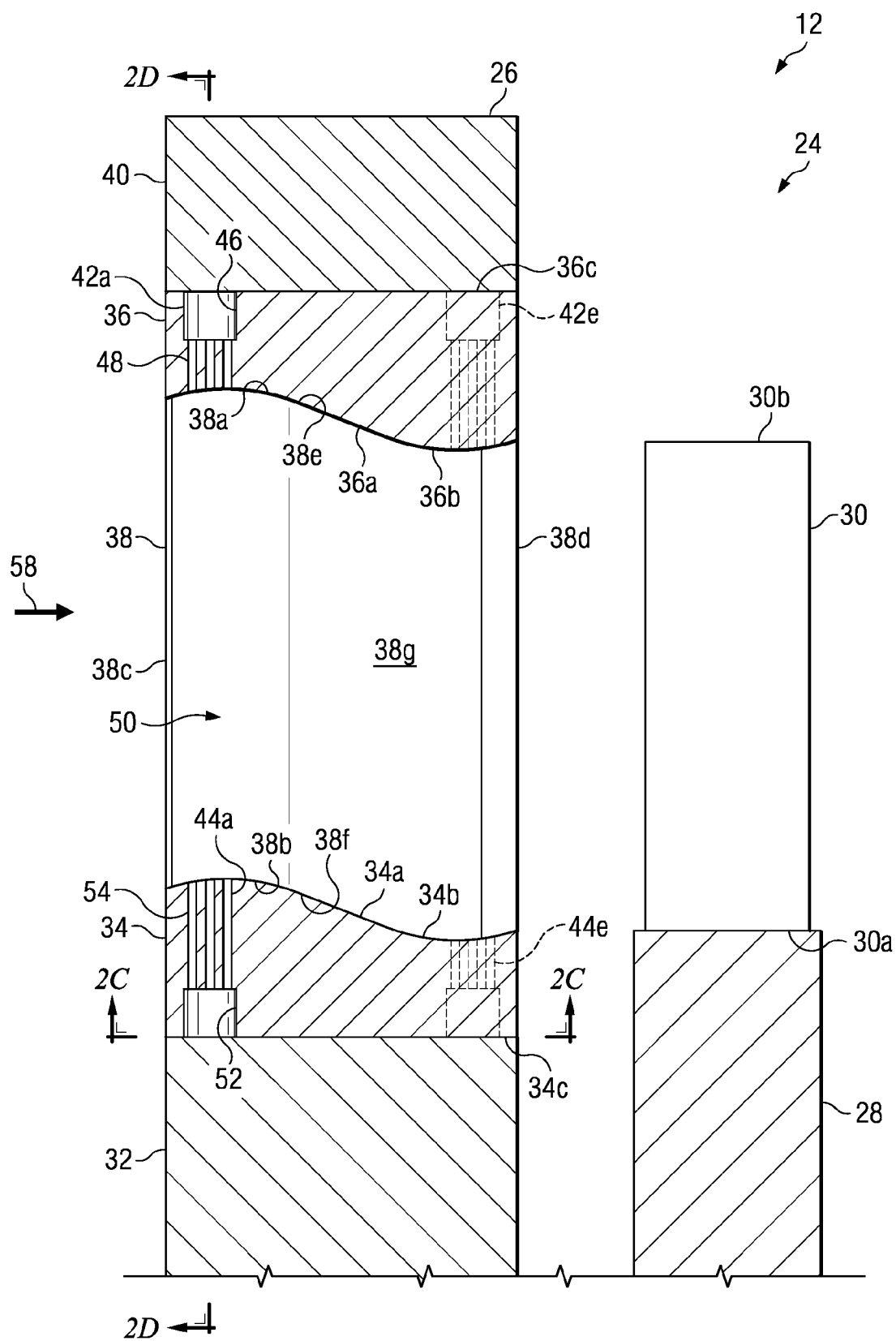
FIG. 2B illustrates a sectional view of the diaphragm of FIG. 2A, and of a turbine wheel and blade, according to respective exemplary embodiments.
Figure 2C:
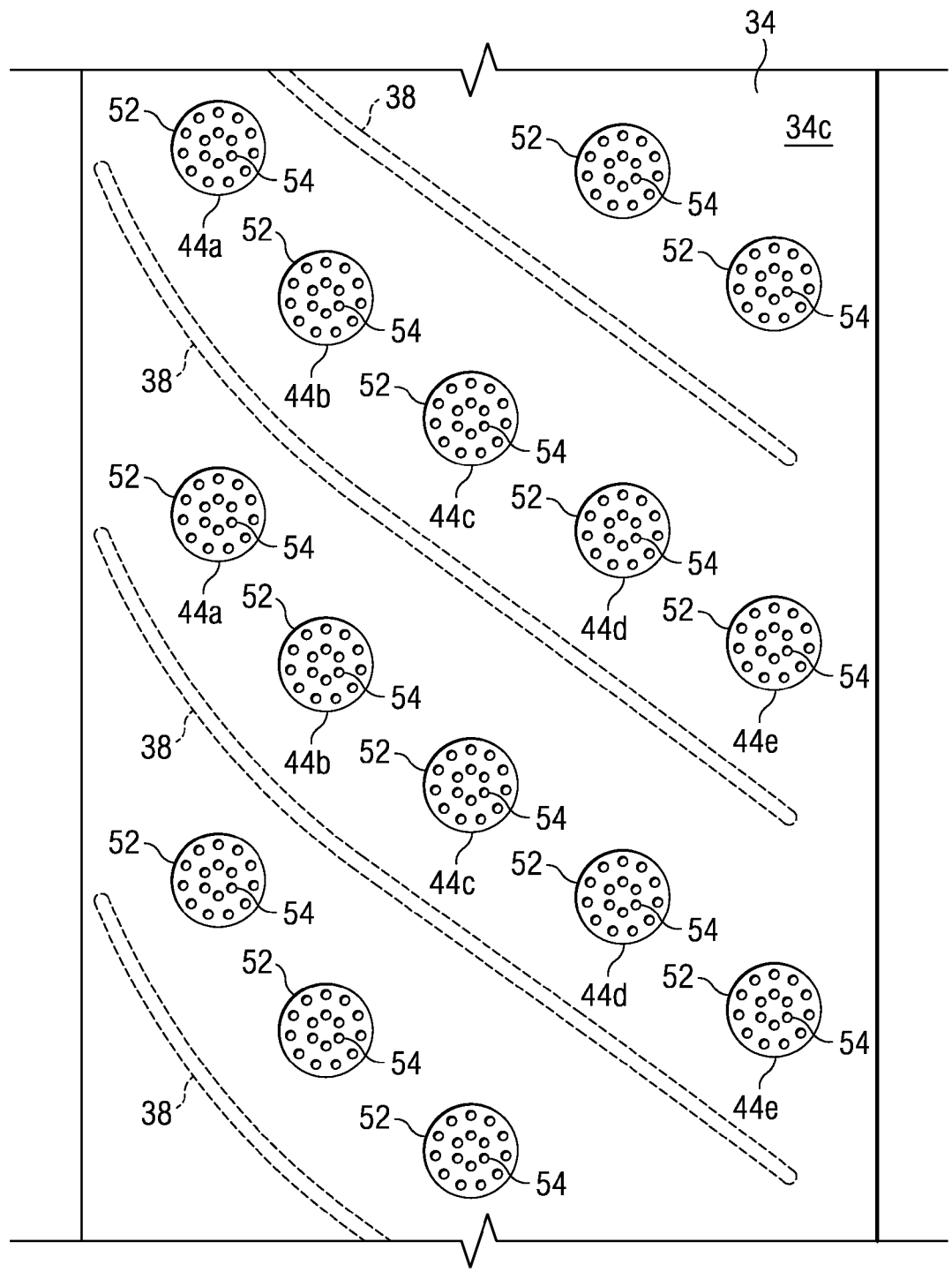
FIG. 2C illustrates a sectional view of a portion of the section of the diaphragm of FIGS. 2A and 2B taken along line 2C-2C, according to an exemplary embodiment.
Figure 2D:
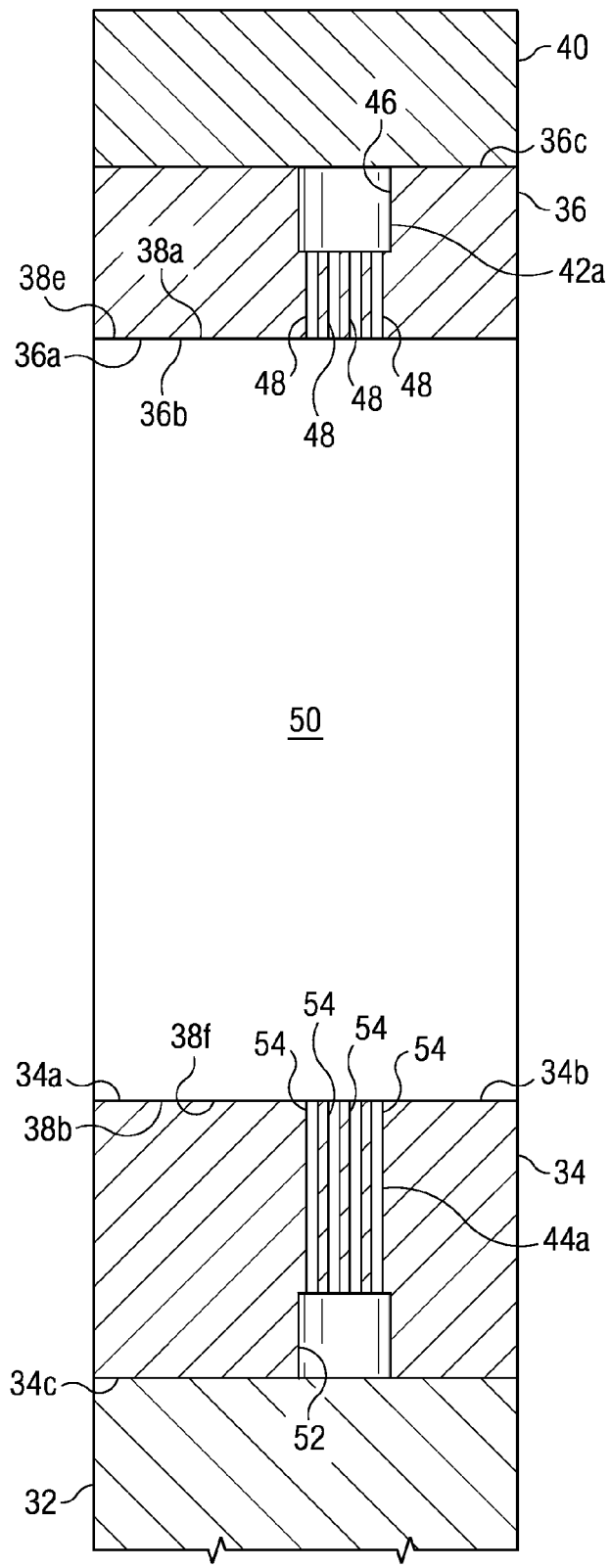
FIG. 2D illustrates a sectional view of the portion of the section of the diaphragm of FIGS. 2A, 2B and 2C taken along line 2D-2D, according to an exemplary embodiment.

In an exemplary embodiment, the steam turbine 24 is a single stage turbine, with the diaphragm 26 and wheel 28 shown in FIG. 2B forming at least part of the single stage. In another exemplary embodiment, the steam turbine 24 is a multi-stage turbine, with the diaphragm 26 and wheel 28 shown in FIG. 2B forming at least part of one of the stages. In several exemplary embodiments, the steam turbine 24 includes other components not shown in the figures, such as, for example, one or more steam seals such as labyrinth seals and/or carbon rings, one or more valves such as governor valves and/or trip valves, one or more overspeed trip devices, one or more bearing assemblies, one or more turbine supports, and/or any combination thereof.

As shown in FIGS. 2A, 2B, 2C and 2D, the diaphragm 26 includes an inner member, or inner annular section 32, and an inner member, or inner ring 34, extending circumferentially about, and coupled to, the annular section 32. A circumferentially-extending surface 34a, which defines a generally axially extending profile 34b (as viewed in FIG. 2B), is defined by the inner ring 34. A circumferentially-extending surface 34c, which abuts the inner annular section 32, is also defined by the inner ring 34. An outer ring 36 extends circumferentially about the inner ring 34, defines a circumferentially-extending surface 36a defining a generally axially extending profile 36b (as viewed in FIG. 2B), and further defines a circumferentially-extending surface 36c. A plurality of stationary vanes or blades 38 including outer end portions 38a and inner end portions 38b, and defining leading edges 38c and trailing edges 38d, extend radially between, and are coupled to, the inner ring 34 and the outer ring 36. The end portions 38a and 38b define generally axially extending profiles 38e and 38f, respectively, which correspond to the generally axially extending profiles 36b and 34b, respectively, of the rings 36 and 34, respectively, as viewed in FIG. 2B. Each of the blades 38 further defines a surface 38g having a curvature including one or more flat portions, concave portions, convex portions, and/or any combination thereof. An outer annular section 40 extends circumferentially about, and is coupled to, the outer ring 36, abutting the surface 36c of the ring 36. In an exemplary embodiment, the outer annular section 40 is coupled to the casing (not shown) of the steam turbine 24; in an exemplary embodiment, instead of, or in addition to the outer annular section 40 being coupled to the casing of the steam turbine 24, one or more of the inner annular section 32, the inner ring 34, and the outer ring 36 are coupled to the casing of the steam turbine 24.

In several exemplary embodiments, the diaphragm 26 is, or at least includes in whole or in part, one or more of the embodiments of turbine components disclosed in commonly assigned U.S. Pat. No. 5,447,413, the disclosure of which is incorporated herein by reference to the extent the incorporated disclosure is not inconsistent with the present disclosure. In several exemplary embodiments, one or more of the inner annular section 32, the inner ring 34, the outer ring 36, the blades 38, and the outer annular section 40 include in whole or in part one or more of the embodiments of turbine components disclosed in the '413 patent. In an exemplary embodiment, the diaphragm 26 is, or at least includes, a profiled ring and vane (PRV) diaphragm, which type of turbine diaphragm is commercially available from the Dresser-Rand Company, Houston, Tex., USA.

As shown in FIGS. 2A, 2B, 2C and 2D, a plurality of groups of acoustic resonators 42 are formed in the outer ring 36, with each of the groups 42 being circumferentially positioned between a respective pair of adjacent blades 38 and relatively proximate one of the surfaces 38g. Each of the groups 42 includes acoustic resonators 42a, 42b, 42c, 42d and 42e, which may be formed in the outer ring 36 in a series along a path that generally conforms to at least the curvature of the respective surface 38g relatively proximate the resonators 42a, 42b, 42c, 42d and 42e, and that generally conforms to the generally axially extending profile 36b (as viewed in FIG. 2B) of the surface 36a of the outer ring 36. The acoustic resonator 42a may be positioned proximate the respective leading edges 38c of the pair of adjacent blades 38, and the acoustic resonator 42e may be positioned proximate the respective trailing edges 38d of the pair of adjacent blades 38. Similar to the formation of the plurality of groups of acoustic resonators 42 in the ring 36, a plurality of groups of acoustic resonators 44 may be formed in the inner ring 34, with each of the groups 44 being circumferentially positioned between a respective pair of adjacent blades 38 and relatively proximate one of the surfaces 38g. Each of the groups 44 includes acoustic resonators 44a, 44b, 44c, 44d and 44e, which may be formed in the inner ring 34 in a series along a path that generally conforms to at least the curvature of the respective surface 38g relatively proximate the resonators 44a, 44b, 44c, 44d and 44e, and that generally conforms to the generally axially extending profile 34b (as viewed in FIG. 2B) of the surface 34a of the inner ring 34. The acoustic resonator 44a may generally be positioned proximate the respective leading edges 38c of the pair of adjacent blades 38, and the acoustic resonator 44e may be positioned proximate the respective trailing edges 38d of the pair of adjacent blades 38.

Each of the acoustic resonators 42a, 42b, 42c, 42d and 42e includes a relatively large cell, or opening 46, formed in the surface 36c of the outer ring 36 and extending into the ring 36 but not through its entire radial thickness. A plurality of relatively small cells, or openings 48, are formed in the surface 36a of the outer ring 36 and extend from the surface 36a and to the cell 46, thereby coupling the cell 46 to a flow region 50 defined between the respective pair of adjacent blades 38. Since the surface 36c abuts the outer annular section 40, the section 40 caps the open end of the cell 46 opposing the cells 48. In an exemplary embodiment, the cells 48 are formed in one or more random distributions relative to the cell 46, in one or more patterns of substantially uniform distribution relative to the cell 46, and/or in any combination thereof. Due to the profile 36b defined by the surface 36a of the outer ring 36, the thickness of the outer ring 36 varies in a horizontal direction, as viewed in FIG. 2B, and thus the respective total depth or radial thickness of the acoustic resonators 42a, 42b, 42c, 42d and 42e varies from the respective leading edges 38c to the respective trailing edges 38d of the two blades 38 between which the resonators are disposed. For example, the total depth or radial thickness of the acoustic resonator 42a is less than the total depth or radial thickness of the acoustic resonator 42e. In an exemplary embodiment, the cell 46 is in the form of a bore having a relatively large cross section, and each of the cells 48 is in the form of a bore having a relatively small cross section. In an exemplary embodiment, the cell 46, and each of the cells 48, have a circular or disk-like cross section. In several exemplary embodiments, instead of, or in addition to a disk-like cross section, the cell 46, and/or one or more of the cells 48, have a rectangular cross section, a square cross section, a hexagonal cross section, one or more other cross sections having other types of shapes, and/or any combination thereof.

In a manner similar to the acoustic resonators 42a, 42b, 42c, 42d and 42e, each of the acoustic resonators 44a, 44b, 44c, 44d and 44e includes a relatively large cell, or opening, 52 formed in the surface 34c of the inner ring 34 and extending into the ring 34 but not through its entire radial thickness. A plurality of relatively small cells, or openings 54, are formed in the surface 34a of the inner ring 34 and extend from the surface 34a and to the cell 52, thereby coupling the cell 52 to the flow region 50 defined between the respective pair of adjacent blades 38. Since the surface 34c abuts the inner annular section 32, the section 32 caps the open end of the cell 52 opposing the cells 54. In an exemplary embodiment, the cells 54 are formed in one or more random distributions relative to the cell 52, in one or more patterns of substantially uniform distribution relative to the cell 52, and/or in any combination thereof. Due to the profile 34b defined by the surface 34a of the inner ring 34, the thickness of the inner ring 34 varies in a horizontal direction, as viewed in FIG. 2B, and thus the respective total depth or radial thickness of the acoustic resonators 44a, 44b, 44c, 44d and 44e varies from the respective leading edges 38c to the respective trailing edges 38d of the two blades 38 between which the resonators are disposed. For example, the total depth or radial thickness of the acoustic resonator 44a is greater than the total depth or radial thickness of the acoustic resonator 44e. In an exemplary embodiment, the cell 52 is in the form of a bore having a relatively large cross section, and each of the cells 54 is in the form of a bore having a relatively small cross section. In an exemplary embodiment, the cell 52, and each of the cells 54, have a circular or disk-like cross section. In several exemplary embodiments, instead of, or in addition to a disk-like cross section, the cell 52, and/or one or more of the cells 54, have a rectangular cross section, a square cross section, a hexagonal cross section, one or more other cross sections having other types of shapes, and/or any combination thereof.

In operation, in an exemplary embodiment with continuing reference to FIGS. 1, 2A, 2B, 2C and 2D, the steam turbine 24 receives a fluid, such as steam, at the pressure P1 via the conduit section 14, and then expands the steam, so that the steam exits the steam turbine 24 and enters the conduit section 16 at the pressure P2, which, as noted above, is less than the pressure P1. During its flow through the steam turbine 24, the steam flows through the respective flow regions 50 defined between adjacent pairs of the stationary blades 38 of the stationary diaphragm 26, from the respective leading edges 38c to the respective trailing edges 38d of the blades 38, as indicated by arrows 56 and 58 in FIGS. 2A and 2B, respectively. The blades 38 of the diaphragm 26 direct the steam to the turbine blades 30 coupled to the wheel 28. As a result, angular momentum of the flowing steam is imparted to the blades 30, which impartation causes the rotation of the blades 30 and thus the wheel 28, which rotation causes, or at least contributes to causing, the rotation of the shaft (not shown) from which the turbine wheel 28 radially extends. During its flow through the steam turbine 24, the steam expands and experiences a pressure drop, at least during the flow of the steam through the respective flow regions 50 defined between adjacent pairs of the stationary blades 38 of the stationary diaphragm 26, and/or during the flow of the steam between the rotating blades 30 coupled to the rotating turbine wheel 28.

In an exemplary embodiment, during its operation, the steam turbine 24 is a noise source, generating acoustic energy, or noise, and producing a noise level. In several exemplary embodiments, acoustic energy is generated in response to one or more of the following: the entrance of the steam into the steam turbine 24 from the conduit section 14; the flow of the steam over the respective leading edges 38c of the blades 38; the flow of the steam through the respective flow regions 50 defined between adjacent pairs of the stationary blades 38 of the stationary diaphragm 26; the flow of the steam over the respective trailing edges 38d of the blades 38; the impartation of angular momentum of the flowing steam to the blades 30; the exit of the steam from the steam turbine 24 and its entrance into the conduit section 16; and/or any combination thereof. The groups of acoustic resonators 42a, 42b, 42c, 42d and 42e, and the groups of acoustic resonators 44a, 44b, 44c, 44d and 44e, attenuate the acoustic energy generated by the above-described operation of the steam turbine 24, thereby reducing the noise level produced by the turbine 24.

In several exemplary embodiments, during the operation of the steam turbine 24, due at least in part to the above-described abutment between the inner ring 34 and the inner annular section 32 and thus the capping of the open ends of the respective cells 52 opposing the respective cells 54 by the inner annular section 32, and further due at least in part to the arrangement of the cells 52 and 54, the groups of acoustic resonators 44a, 44b, 44c, 44d and 44e operate as arrays of acoustic resonators working collectively on the respective principles of quarter-wave resonators, Helmholtz resonators, one or more other types of resonators, and/or any combination thereof. In an exemplary embodiment, each of the cells 52 behaves like a dead or nearly-dead volume to the flow through the steam turbine 24, but is at least partially transparent to acoustic energy or noise; as sound waves oscillate through the corresponding cells 54, acoustic energy is transformed into vorticity and is dissipated. Similarly, due at least in part to the above-described abutment between the outer ring 36 and the outer annular section 40 and thus the capping of the open ends of the respective cells 46 opposing the respective cells 48 by the outer annular section 40, and further due at least in part to the arrangement of the cells 46 and 48, the groups of acoustic resonators 42a, 42b, 42c, 42d and 42e operate as arrays of acoustic resonators working collectively on the respective principles of quarter-wave resonators, Helmholtz resonators, one or more other types of resonators, and/or any combination thereof. In an exemplary embodiment, each of the cells 46 behaves like a dead or nearly-dead volume to the flow through the steam turbine 24, but is at least partially transparent to acoustic energy or noise; as sound waves oscillate through the corresponding cells 48, acoustic energy is transformed into vorticity and is dissipated.

In an exemplary embodiment, the above-described locations of the acoustic resonators 42a, 42b, 42c, 42d, 42e, 44a, 44b, 44c, 44d and 44e are positioned relatively close to several of the noise sources within the steam turbine 24, which noise sources are noted above, and thus reduce the possibility that the acoustic energy will by-pass the groups of acoustic resonators 42a, 42b, 42c, 42d, 42e, 44a, 44b, 44c, 44d and 44e, thereby facilitating the attenuation of acoustic energy generated by the steam turbine 24. For example, the above-described locations of the acoustic resonators 42a, 42b, 42c, 42d, 42e, 44a, 44b, 44c, 44d and 44e are positioned relatively close to, among other potential noise sources, the flow of the steam over the respective leading edges 38c of the blades 38, the flow of the steam through the respective flow regions 50 defined between adjacent pairs of the stationary blades 38 of the stationary diaphragm 26, the flow of the steam over the respective trailing edges 38d of the blades 38, and the impartation of angular momentum of the flowing steam to the blades 30.

In several exemplary embodiments, the attenuation of the acoustic energy by the groups of acoustic resonators 42a, 42b, 42c, 42d and 42e, and by the groups of acoustic resonators 44a, 44b, 44c, 44d and 44e, reduces the risk of any structural failure due to vibrations and/or other types of dynamic and/or vibratory loading, within and/or relatively proximate the steam turbine 24 and/or the conduit sections 14 and 16. Moreover, the attenuation of acoustic energy by the groups of acoustic resonators 42a, 42b, 42c, 42d, 42e, and the groups of acoustic resonators 44a, 44b, 44c, 44d and 44e, reduces the risk that one or more of the steam turbine 24, the conduit section 14, and the conduit section 16 will become a noise nuisance during the operation of the steam turbine 24.

In several exemplary embodiments, the dominant noise source generated within the steam turbine 24 is effectively lowered by tuning the rings 34 and/or 36 so that maximum sound attenuation occurs around the frequency of the dominant noise source; this tuning is accomplished by varying one or more of the volume, the cross-sectional area, the number, and the dimensions, of one or more of the cells 46, 48, 52 and 54. In several exemplary embodiments, if the steam turbine 24 is a variable steam turbine, the number of the smaller cells 48 per each larger cell 46 is varied spatially across the ring 36, and/or the number of the smaller cells 54 per each larger cell 52 is varied spatially across the ring 34, in order to effectively attenuate acoustic energy across a broad frequency band.

In several exemplary embodiments, the number and the patterns of the cells 46 and 48, and/or the number and the patterns of the cells 52 and 54, are varied. In several exemplary embodiments, the relative dimensions and shapes of the cells 46, 48, 52 and 54 are varied.

In several exemplary embodiments, instead of being formed in the ring 36, one or more of the groups of acoustic resonators 42a, 42b, 42c, 42d and 42e are formed in one or more curved plates which are mounted to the ring 36 so that the curved plates are flush with the surface 36a, and the open ends of the cells 46 opposing the cells 48 abut either a surface of the ring 36 or the outer annular section 40. In several exemplary embodiments, instead of being formed in the ring 34, one or more of the groups of acoustic resonators 44a, 44b, 44c, 44d and 44e are formed in one or more curved plates which are mounted to the ring 34 so that the curved plates are flush with the surface 34a, and the open ends of the cells 52 opposing the cells 54 abut either a surface of the ring 34 or the inner annular section 32. In an exemplary embodiment, additional rings (not shown) are disposed between the ring 34 and the inner annular section 32, and/or between the ring 36 and the outer annular section 40, respectively, and acoustic resonators are formed in the additional rings in manners substantially similar to the manner by which the resonators 44a, 44b, 44c, 44d and 44e are formed in the ring 34, and the manner by which the resonators 42a, 42b, 42c, 42d and 44e are formed in the ring 36, respectively.

Figure 3A:
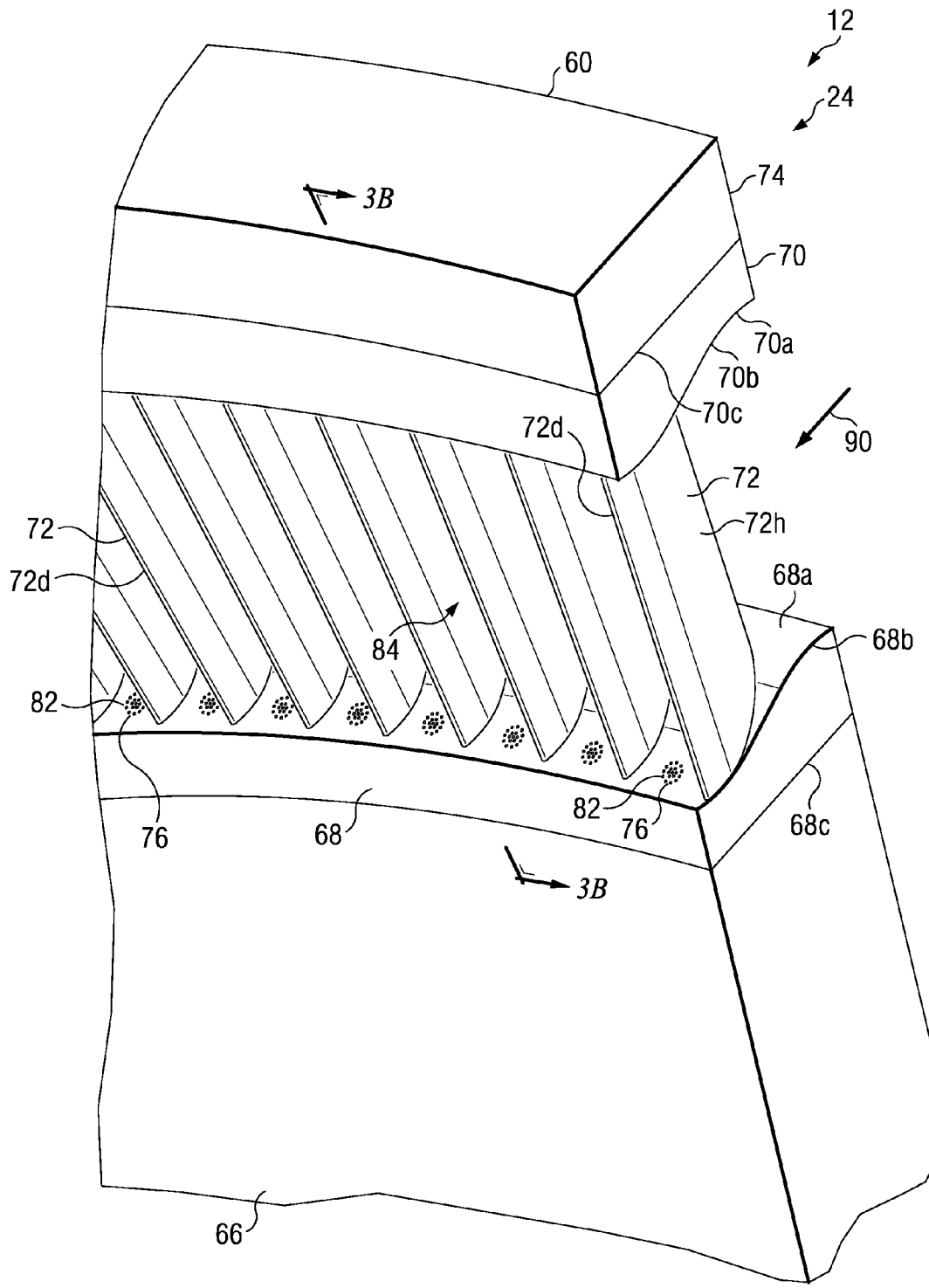
FIG. 3A illustrates a perspective view of a portion of a nozzle ring of a steam turbine, according to an exemplary embodiment, the steam turbine being, including, or being at least a part of, the fluid expansion device of FIG. 1 and the nozzle ring including two pluralities of acoustic resonators, according to respective exemplary embodiments.
Figure 3B:
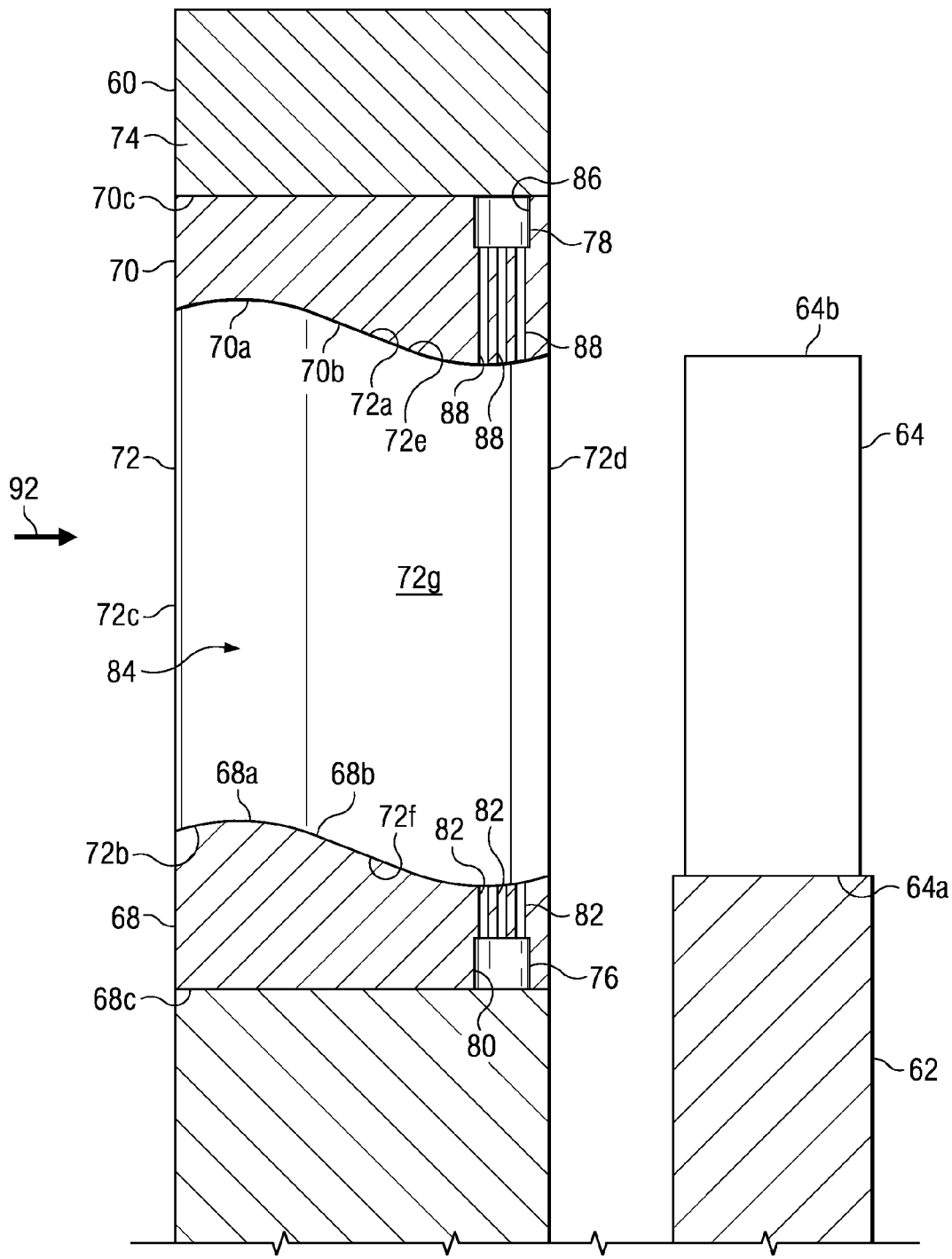
FIG. 3B illustrates a sectional view of the portion of the nozzle ring of FIG. 3A taken along line 3B-3B, according to an exemplary embodiment.

In an exemplary embodiment, as illustrated in FIGS. 3A and 3B with continuing reference to FIGS. 1, 2A, 2B, 2C and 2D, instead of, or in addition to one or more of the stationary diaphragms 26, the steam turbine 24 includes one or more nozzle rings 60, one of which is shown in FIGS. 3A and 3B. A rotatable steam turbine wheel 62 (FIG. 3B) is positioned immediately downstream of each of the nozzle rings 60. A plurality of blades 64, each of which includes a base 64a and a tip 64b, extend radially outwardly from each of the turbine wheels 62. The one or more nozzle rings 60 and wheels 62, and the blades 64, are housed in a housing or casing (not shown), and the one or more wheels 62 and blades 64 are part of a rotor including a shaft (not shown) from which the one or more wheels 62 extend, which rotor is adapted to rotate in place within the casing of the steam turbine 24, while the one or more nozzle rings 60 remain stationary within the casing, under conditions to be described below.

In an exemplary embodiment, the steam turbine 24 is a single stage turbine, with the nozzle ring 60 and wheel 62 shown in FIG. 3B forming at least part of the single stage. In another exemplary embodiment, the steam turbine 24 is a multi-stage turbine, with the nozzle ring 60 and wheel 62 shown in FIG. 3B forming at least part of one of the stages. As noted above, in several exemplary embodiments, the steam turbine 24 includes other components not shown in the figures, such as, for example, one or more steam seals such as labyrinth seals and/or carbon rings, one or more valves such as governor valves and/or trip valves, one or more overspeed trip devices, one or more bearing assemblies, one or more turbine supports, and/or any combination thereof.

As shown in FIGS. 3A and 3B, the nozzle ring 60 includes an inner annular section 66, and an inner ring 68 extending circumferentially about, and coupled to, the annular section 66. A circumferentially-extending surface 68a, which defines a generally axially extending profile 68b (as viewed in FIG. 3B), is defined by the inner ring 68. A circumferentially-extending surface 68c, which abuts the inner annular section 66, is also defined by the inner ring 68. An outer ring 70 extends circumferentially about the inner ring 68, defines a circumferentially-extending surface 70a defining a generally axially extending profile 70b (as viewed in FIG. 3B), and further defines a circumferentially-extending surface 70c. A plurality of stationary vanes or blades 72 including outer end portions 72a and inner end portions 72b, and defining leading edges 72c and trailing edges 72d, extend radially between, and are coupled to, the inner ring 68 and the outer ring 70. The end portions 72a and 72b define generally axially extending profiles 72e and 72f, respectively, which correspond to the generally axially extending profiles 70b and 68b, respectively, of the rings 70 and 68, respectively, as viewed in FIG.

3B. Each of the blades 72 further defines a surface 72g having a curvature including one or more concave and/or convex portions, and an opposing surface 72h having a curvature including one or more concave and/or convex portions. An outer annular section 74 extends circumferentially about, and is coupled to, the outer ring 70, abutting the surface 70c of the ring 70. In an exemplary embodiment, the outer annular section 74 is coupled to the casing (not shown) of the steam turbine 24; in an exemplary embodiment, instead of, or in addition to the outer annular section 74 being coupled to the casing of the steam turbine 24, one or more of the inner annular section 66, the inner ring 68, and the outer ring 70 are coupled to the casing of the steam turbine 24.

In several exemplary embodiments, the nozzle ring 60 is, or at least includes in whole or in part, one or more of the embodiments of turbine components disclosed in commonly assigned U.S. Pat. No. 5,447,413, the disclosure of which is incorporated herein by reference to the extent the incorporated disclosure is not inconsistent with the present disclosure. In several exemplary embodiments, one or more of the inner annular section 66, the inner ring 68, the outer ring 70, the blades 72, and the outer annular section 74 include in whole or in part one or more of the embodiments of turbine components disclosed in the '413 patent. In an exemplary embodiment, the nozzle ring 60 is, or at least includes, a profiled ring and vane (PRV) nozzle ring, which type of nozzle ring is available from the Dresser-Rand Company, Houston, Tex., USA.

As shown in FIGS. 3A and 3B, a plurality of acoustic resonators 76 are formed in the inner ring 68, with each of the acoustic resonators 76 being circumferentially positioned between a respective pair of adjacent blades 72 and relatively proximate the respective trailing edges 72d thereof. Similar to the formation of the plurality of acoustic resonators 76 in the ring 70, a plurality of acoustic resonators 78 are formed in the outer ring 70, with each of the groups 78 being circumferentially positioned between a respective pair of adjacent blades 72 and relatively proximate the respective trailing edges 72d thereof.

Each of the acoustic resonators 76 includes a relatively large cell, or opening, 80 formed in the surface 68c of the inner ring 68 and extending into the ring 68 but not through its entire radial thickness. A plurality of relatively small cells, or openings 82, are formed in the surface 68a of the inner ring 68 and extend from the surface 68a and to the cell 80, thereby coupling the cell 80 to a flow region 84 defined between the respective pair of adjacent blades 72. Since the surface 68c abuts the inner annular section 66, the section 66 caps the open end of the cell 80 opposing the cells 82. In an exemplary embodiment, the cells 82 are formed in one or more random distributions relative to the cell 80, in one or more patterns of substantially uniform distribution relative to the cell 80, and/or in any combination thereof. In an exemplary embodiment, the cell 80 is in the form of a bore having a relatively large cross section, and each of the cells 82 is in the form of a bore having a relatively small cross section. In an exemplary embodiment, the cell 80, and each of the cells 82, have a circular or disk-like cross section. In several exemplary embodiments, instead of, or in addition to a disk-like cross section, the cell 80, and/or one or more of the cells 82, have a rectangular cross section, a square cross section, a hexagonal cross section, one or more other cross sections having other types of shapes, and/or any combination thereof.

In a manner similar to the acoustic resonators 76, each of the acoustic resonators 78 includes a relatively large cell, or opening, 86 formed in the surface 70c of the outer ring 70 and extending into the ring 70 but not through its entire radial thickness. A plurality of relatively small cells, or openings 88, are formed in the surface 70a of the outer ring 70 and extend from the surface 70a and to the cell 86, thereby coupling the cell 86 to the flow region 84 defined between the respective pair of adjacent blades 72. Since the surface 70c abuts the outer annular section 74, the section 74 caps the open end of the cell 86 opposing the cells 88. In an exemplary embodiment, the cells 88 are formed in one or more random distributions relative to the cell 86, in one or more patterns of substantially uniform distribution relative to the cell 86, and/or in any combination thereof. In an exemplary embodiment, the cell 86 is in the form of a bore having a relatively large cross section, and each of the cells 88 is in the form of a bore having a relatively small cross section. In an exemplary embodiment, the cell 86, and each of the cells 88, have a circular or disk-like cross section. In several exemplary embodiments, instead of, or in addition to a disk-like cross section, the cell 86, and/or one or more of the cells 88, have a rectangular cross section, a square cross section, a hexagonal cross section, one or more other cross sections having other types of shapes, and/or any combination thereof.

In operation, in an exemplary embodiment with continuing reference to FIGS. 1, 3A and 3B, the steam turbine 24 receives a fluid, such as steam, at the pressure P1 via the conduit section 14, and then expands the steam, so that the steam exits the steam turbine 24 and enters the conduit section 16 at the pressure P2, which, as noted above, is less than the pressure P1. During its flow through the steam turbine 24, the steam flows through the respective flow regions 84 defined between adjacent pairs of the stationary blades 72 of the stationary nozzle ring 60, from the respective leading edges 72c to the respective trailing edges 72d of the blades 72, as indicated by arrows 90 and 92 in FIGS. 3A and 3B, respectively. The blades 72 of the nozzle ring 60 direct the steam to the turbine blades 64 coupled to the wheel 62. As a result, angular momentum of the flowing steam is imparted to the blades 64, which impartation causes the rotation of the blades 64 and thus the wheel 62, which rotation causes, or at least contributes to causing, the rotation of the shaft (not shown) from which the turbine wheel 62 radially extends. During its flow through the steam turbine 24, the steam expands and experiences a pressure drop, at least during the flow of the steam through the respective flow regions 84 defined between adjacent pairs of the stationary blades 72 of the stationary nozzle ring 60, and/or during the flow of the steam between the rotating blades 64 coupled to the rotating turbine wheel 62.

In an exemplary embodiment, during its operation, the steam turbine 24 is a noise source, generating acoustic energy, or noise, and producing a noise level. In several exemplary embodiments, acoustic energy is generated in response to one or more of the following: the entrance of the steam into the steam turbine 24 from the conduit section 14; the flow of the steam over the respective leading edges 72c of the blades 72; the flow of the steam through the respective flow regions 84 defined between adjacent pairs of the stationary blades 72 of the stationary nozzle ring 60; the flow of the steam over the respective trailing edges 72d of the blades 72; the impartation of angular momentum of the flowing steam to the blades 64; the exit of the steam from the steam turbine 24 and its entrance into the conduit section 16; and/or any combination thereof. The plurality of acoustic resonators 76, and the plurality of acoustic resonators 78, attenuate the acoustic energy generated by the above-described operation of the steam turbine 24, thereby reducing the noise level produced by the turbine 24.

In several exemplary embodiments, during the operation of the steam turbine 24, due at least in part to the above-described abutment between the inner ring 68 and the inner annular section 66 and thus the capping of the open ends of the respective cells 80 opposing the respective cells 82 by the inner annular section 66, and further due at least in part to the arrangement of the cells 80 and 82, the acoustic resonators 76 operate as arrays of acoustic resonators working collectively on the respective principles of quarter-wave resonators, Helmholtz resonators, one or more other types of resonators, and/or any combination thereof. In an exemplary embodiment, each of the cells 80 behaves like a dead or nearly-dead volume to the flow through the steam turbine 24, but is at least partially transparent to acoustic energy or noise; as sound waves oscillate through the corresponding cells 82, acoustic energy is transformed into vorticity and is dissipated. Similarly, due at least in part to the above-described abutment between the outer ring 70 and the outer annular section 74 and thus the capping of the open ends of the respective cells 86 opposing the respective cells 88 by the outer annular section 74, and further due at least in part to the arrangement of the cells 86 and 88, the groups of acoustic resonators 78 operate as arrays of acoustic resonators working collectively on the respective principles of quarter-wave resonators, Helmholtz resonators, one or more other types of resonators, and/or any combination thereof. In an exemplary embodiment, each of the cells 86 behaves like a dead or nearly-dead volume to the flow through the steam turbine 24, but is at least partially transparent to acoustic energy or noise; as sound waves oscillate through the corresponding cells 88, acoustic energy is transformed into vorticity and is dissipated.

In an exemplary embodiment, the above-described locations of the acoustic resonators 76 and 78 are positioned relatively close to several of the noise sources within the steam turbine 24, which noise sources are noted above, and thus reduce the possibility that the acoustic energy will bypass the acoustic resonators 76 and 78, thereby facilitating the attenuation of acoustic energy generated by the steam turbine 24. For example, the above-described locations of the acoustic resonators 76 and 78 are positioned relatively close to, among other potential noise sources, the flow of the steam over the respective trailing edges 72d of the blades 72, which produces a relatively large amount of acoustic energy.

In several exemplary embodiments, the attenuation of the acoustic energy by the acoustic resonators 76 and 78 reduces the risk of any structural failure due to vibrations and/or other types of dynamic and/or vibratory loading, within and/or relatively proximate the steam turbine 24 and/or the conduit sections 14 and 16. Moreover, the attenuation of acoustic energy by the acoustic resonators 76 and 78 reduces the risk that one or more of the steam turbine 24, the conduit section 14, and the conduit section 16 will become a noise nuisance during the operation of the steam turbine 24.

In several exemplary embodiments, the dominant noise source generated within the steam turbine 24 is effectively lowered by tuning the rings 68 and/or 70 so that maximum sound attenuation occurs around the frequency of the dominant noise source; this tuning is accomplished by varying one or more of the volume, the cross-sectional area, the number, and the dimensions, of one or more of the cells 86, 88, 80 and 82. In several exemplary embodiments, if the steam turbine 24 is a variable steam turbine, the number of the smaller cells 88 per each larger cell 86 is varied spatially across the ring 70, and/or the number of the smaller cells 82 per each larger cell 80 is varied spatially across the ring 68, in order to effectively attenuate acoustic energy across a broad frequency band.

In several exemplary embodiments, the number and the patterns of the cells 86 and 88, and/or the number and the patterns of the cells 80 and 82, are varied. In several exemplary embodiments, the relative dimensions and shapes of the cells 86, 88, 80 and 82 are varied.

In several exemplary embodiments, instead of being formed in the ring 70, one or more of the groups of acoustic resonators 78 are formed in one or more curved plates which are mounted to the ring 70 so that the curved plates are flush with the surface 70a, and the open ends of the cells 86 opposing the cells 88 abut either a surface of the ring 70 or the outer annular section 74. In several exemplary embodiments, instead of being formed in the ring 68, one or more of the groups of acoustic resonators 76 are formed in one or more curved plates which are mounted to the ring 68 so that the curved plates are flush with the surface 68a, and the open ends of the cells 80 opposing the cells 82 abut either a surface of the ring 68 or the inner annular section 66.

Figure 3C:
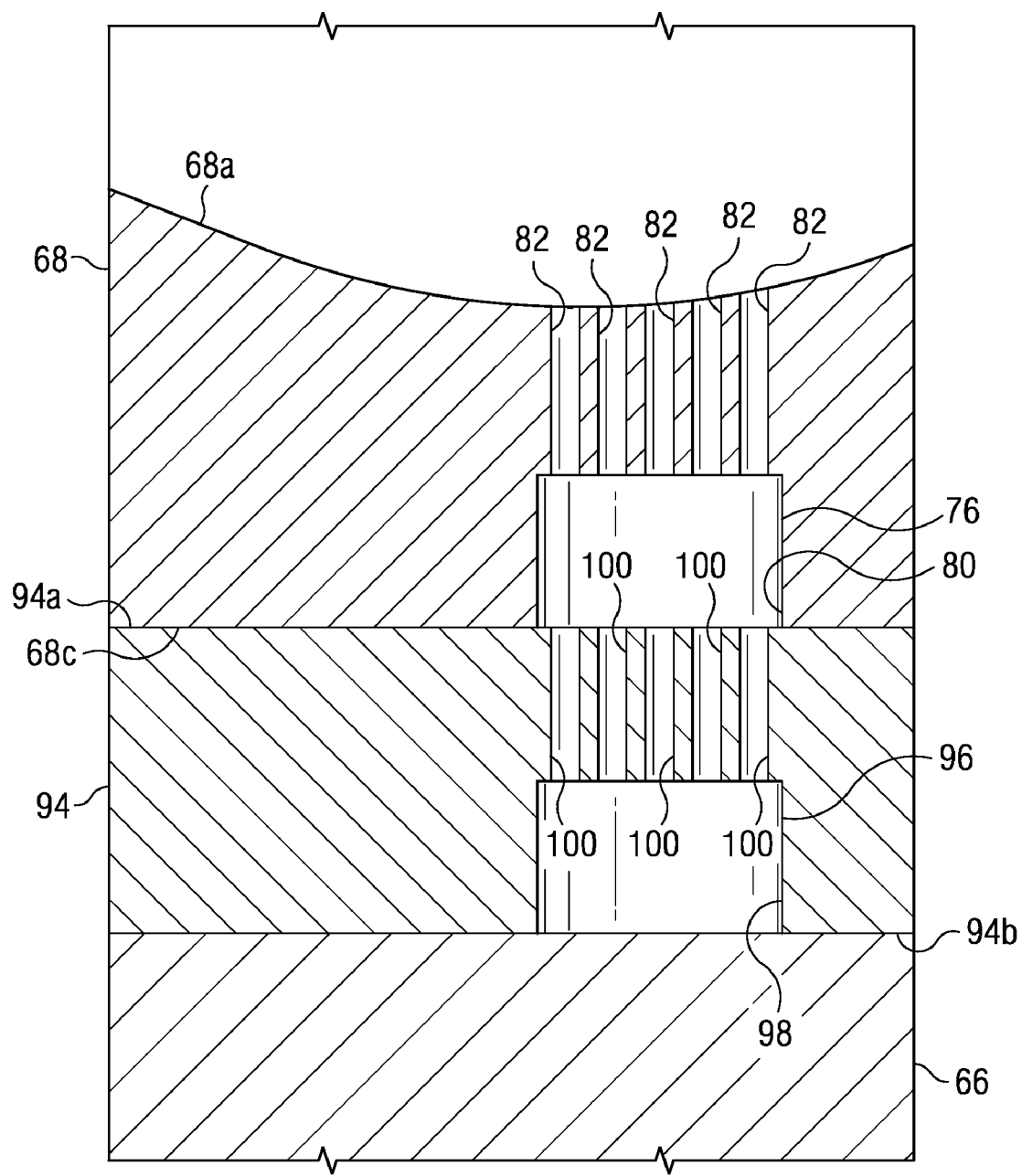
FIG. 3C illustrates an enlarged view of a portion of the nozzle ring of FIGS. 3A and 3B, according to another exemplary embodiment.

In an exemplary embodiment, as illustrated in FIG. 3C with continuing reference to FIGS. 3A and 3B, instead of the surface 68c of the ring 68 abutting the inner annular section 66, a circumferentially-extending ring 94 defining surfaces 94a and 94b is disposed between, and coupled to, the ring 68 and the inner annular section 66, extending circumferentially about the inner annular section 66. A plurality of acoustic resonators 96 are formed in the ring 94. Each of the acoustic resonators 96 is generally radially aligned with one of the acoustic resonators 76, and includes a relatively large cell, or opening, 98 formed in the surface 94b of the ring 94 and extending into the ring 94 but not through its entire radial thickness. A plurality of relatively small cells, or openings 100, are formed in the surface 94a of the ring 94 and extend from the surface 94a and to the cell 98, thereby coupling the cell 98 to the cell 80 of the acoustic resonator 76 generally radially aligned therewith. Since the surface 94b abuts the inner annular section 66, the section 66 caps the open end of the cell 98 opposing the cells 100. In an exemplary embodiment, during the operation of the steam turbine 24 including the nozzle ring 60, the acoustic resonators 76 and 96 work collectively as an array of acoustic resonators in series to attenuate the acoustic energy generated in response to the above-described operation of the steam turbine 24, including the operation of the nozzle ring 60.

In an exemplary embodiment, instead of, or in addition to the above-described inclusion of the ring 94 and the resonators 96 in the nozzle ring 60, an additional ring (not shown) is disposed between, and coupled to, the ring 70 and the outer annular section 74 in a manner substantially similar to the manner in which the ring 94 is disposed between the ring 68 and the inner annular section 66, and acoustic resonators are formed in the additional ring in a manner substantially similar to the manner in which the resonators 96 are formed in the ring 94.

Figure 4A:
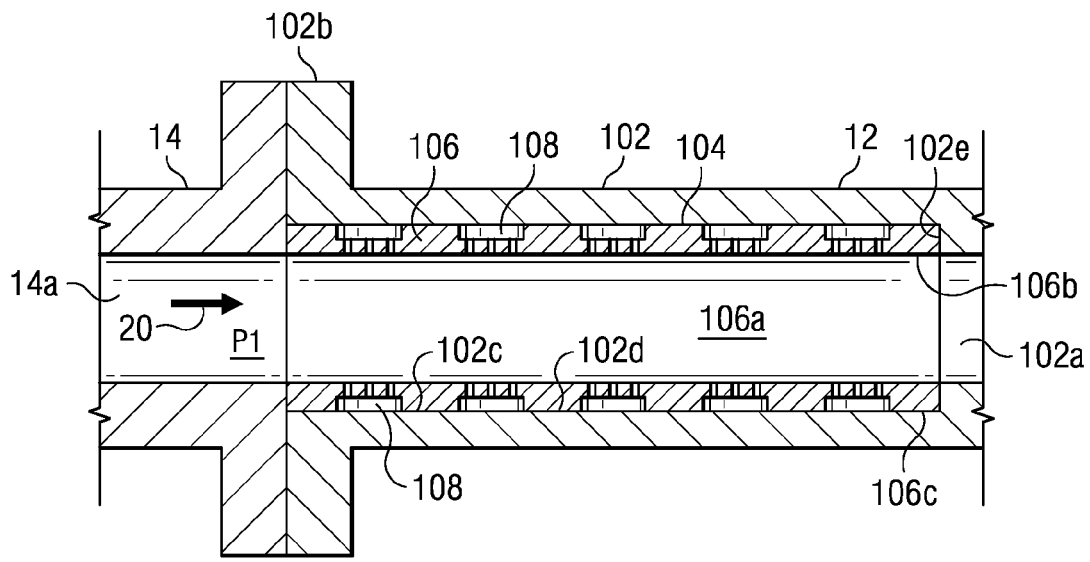
FIG. 4A illustrates a sectional view of an inlet of the fluid expansion device of FIG. 1, according to an exemplary embodiment, the inlet including an acoustic liner, according to an exemplary embodiment.
Figure 4B:
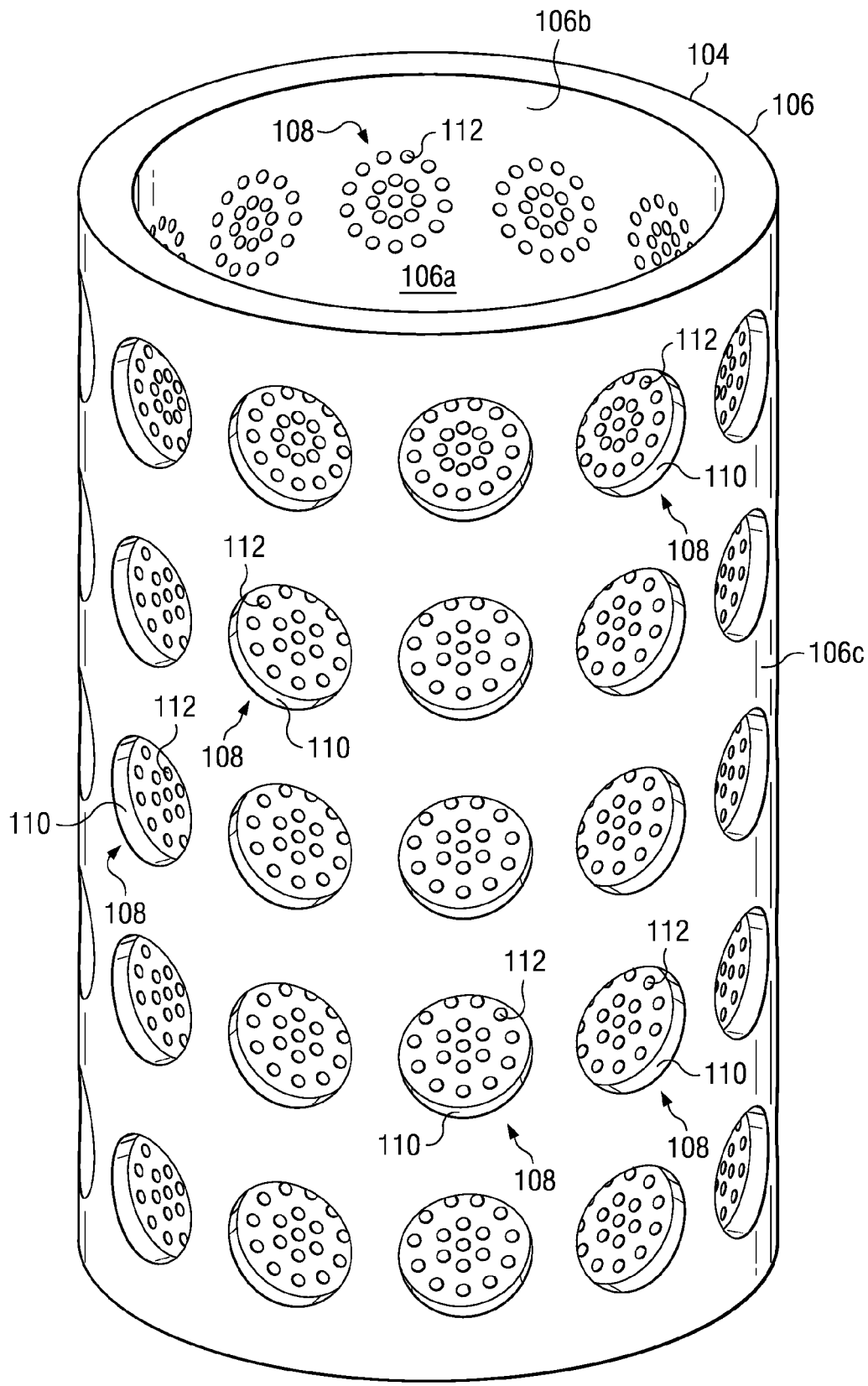
FIG. 4B illustrates a perspective view of the acoustic liner of FIG. 4A, according to an exemplary embodiment.

In an exemplary embodiment, as illustrated in FIGS. 4A and 4B with continuing reference to FIG. 1, the fluid expansion device 12 includes a member, or inlet 102, defining an internal passage 102a fluidicly coupled with an internal passage 14a defined by the conduit section 14. The inlet 102 includes a flange 102b and an internal annular recess 102c formed in an inside surface of the inlet 102, with the recess 102c defining an inside surface 102d, one end of the internal annular recess 102c defining an internal shoulder 102e, and the other end of the recess 102c being aligned with the face of the flange 102b.

A one-piece, unitary acoustic liner 104 is disposed in the recess 102c so that one end of the acoustic liner 104 abuts or is at least relatively proximate the internal shoulder 102e, and the other end of the acoustic liner 104 is aligned or nearly aligned with the face of the flange 102*b*. The liner 104 includes a cylindrical or annular member, or shell 106, defining an internal passage 106*a*, an inside surface 106*b*, and an outside surface 106*c*. The internal passage 106*a* is fluidically coupled to each of the internal passage 14*a* of the conduit section 14 and the internal passage 102*a* of the inlet 102. The inside surface 106*b* of the shell 106 of the liner 104 is substantially flush with the inside surface of the inlet 102 in which the recess 102*c* is formed.

A plurality of acoustic resonators 108 are formed in the shell 106. Each of the acoustic resonators 108 includes a relatively large cell, or opening, 110 formed in the outside surface 106*c* of the shell 106 and extending into the shell 106 but not through its entire radial thickness. A plurality of relatively small cells, or openings 112, are formed in the inside surface 106*b* of the shell 106 and extend from the inside surface 106*b* and to the opening 110, thereby coupling the cell 110 to the internal passage 106*a* defined by the shell 106. Since the acoustic liner 104 is disposed in the recess 102*c* of the inlet 102, the inside surface 102*d* defined by the recess 102*c* abuts the outside surface 106*c* of the shell 106. As a result, the inside surface 102*d* of the inlet 102 caps the open end of the cell 110 opposing the cells 112. In an exemplary embodiment, the cells 112 are formed in one or more random distributions relative to the cell 110, in one or more patterns of substantially uniform distribution relative to the cell 110, and/or in any combination thereof. In an exemplary embodiment, the cell 110 is in the form of a bore having a relatively large cross section, and each of the cells 112 is in the form of a bore having a relatively small cross section. In an exemplary embodiment, the cell 110, and each of the cells 112, have a circular or disk-like cross section. In several exemplary embodiments, instead of, or in addition to a disk-like cross section, the cell 110, and/or one or more of the cells 112, have a rectangular cross section, a square cross section, a hexagonal cross section, one or more other cross sections having other types of shapes, and/or any combination thereof.

In operation, in an exemplary embodiment, with continuing reference to FIGS. 1, 4A and 4B, the fluid expansion device 12, which is, includes, or is at least part of, for example, a steam turbine, a fluid expander or another type of fluid expansion device, receives a fluid at the pressure P1 via the conduit section 14, and then expands the fluid, so that the fluid exits the fluid expansion device 12 and enters the conduit section 16 at the pressure P2, which is less than the pressure P1. More particularly, the fluid flows through the internal passage 14*a* of the conduit section 14, and then enters the inlet 102 of the fluid expansion device 12, flowing through the internal passages 106*a* and 102*a*.

In an exemplary embodiment, during its operation, the fluid expansion device 12 is a noise source, generating acoustic energy, or noise, and producing a noise level. In several exemplary embodiments, acoustic energy is generated in response to one or more of the following: the entrance of fluid into the inlet 102 from the conduit section 14; fluid flow through the inlet 102; the expansion of the fluid by the fluid expansion device 12; fluid flow from the device 12 and into the conduit section 16; and/or any combination thereof. The acoustic liner 104 attenuates the acoustic energy generated by the above-described operation of the fluid expansion device 12, thereby reducing the noise level produced by the device 12.

In several exemplary embodiments, during the operation of the fluid expansion device 12, due at least in part to the above-described abutment between the inside surface 102*d* of the inlet 102 and the outside surface 106*c* of the shell 106 and thus the capping of the open ends of the respective cells 110 opposing the respective cells 112 by the inside surface 102*d*, and further due at least in part to the arrangement of the cells 110 and 112, the acoustic resonators 108 operate as arrays of acoustic resonators working collectively on the respective principles of quarter-wave resonators, Helmholtz resonators, one or more other types of resonators, and/or any combination thereof. In an exemplary embodiment, each of the cells 110 behaves like a dead or nearly-dead volume to the flow through, for example, the internal passage 106*a*, but is at least partially transparent to acoustic energy or noise; as sound waves oscillate through the corresponding cells 112, acoustic energy is transformed into vorticity and is dissipated.

In an exemplary embodiment, the above-described location of the acoustic liner 104 is relatively close to several of the noise sources within the fluid expansion device 12, which noise sources are noted above, thereby reducing the possibility that the acoustic energy will by-pass the acoustic liner 104, thereby facilitating the attenuation of acoustic energy generated by the fluid expansion device 12.

In several exemplary embodiments, the attenuation of the acoustic energy by the acoustic liner 104 reduces the risk of any structural failure due to vibrations and/or other types of dynamic and/or vibratory loading, within and/or relatively proximate the fluid expansion device 12 and/or the conduit sections 14 and 16. Moreover, the attenuation of acoustic energy by the acoustic liner 104 reduces the risk that one or more of the fluid expansion device 12, the conduit section 14, and the conduit section 16 will become a noise nuisance during the operation of the fluid expansion device 12.

In several exemplary embodiments, the dominant noise source generated within the fluid expansion device 12 is effectively lowered by tuning the acoustic liner 104 so that maximum sound attenuation occurs around the frequency of the dominant noise source; this tuning is accomplished by varying one or more of the volume, the cross-sectional area, the number, and the dimensions, of one or more of the cells 110 and 112. In several exemplary embodiments, the number of the smaller cells 112 per each larger cell 110 is varied spatially across the liner 104 in order to effectively attenuate acoustic energy across a broad frequency band. In several exemplary embodiments, the number and the patterns of the cells 110 and 112, and/or the number and the patterns of the cells 110 and 112, are varied. In several exemplary embodiments, the relative dimensions and shapes of the cells 110 and 112 are varied.

In an exemplary embodiment, the fluid expansion device 12 includes a member or outlet (not shown) substantially similar to the inlet 102, and an acoustic liner substantially similar to the acoustic liner 104 engaging the outlet in a manner substantially similar to the manner by which the acoustic liner 104 engages the inlet 102, and attenuating acoustic energy in a manner substantially similar to the manner by which the acoustic liner 104 attenuates acoustic energy.

Figure 5:
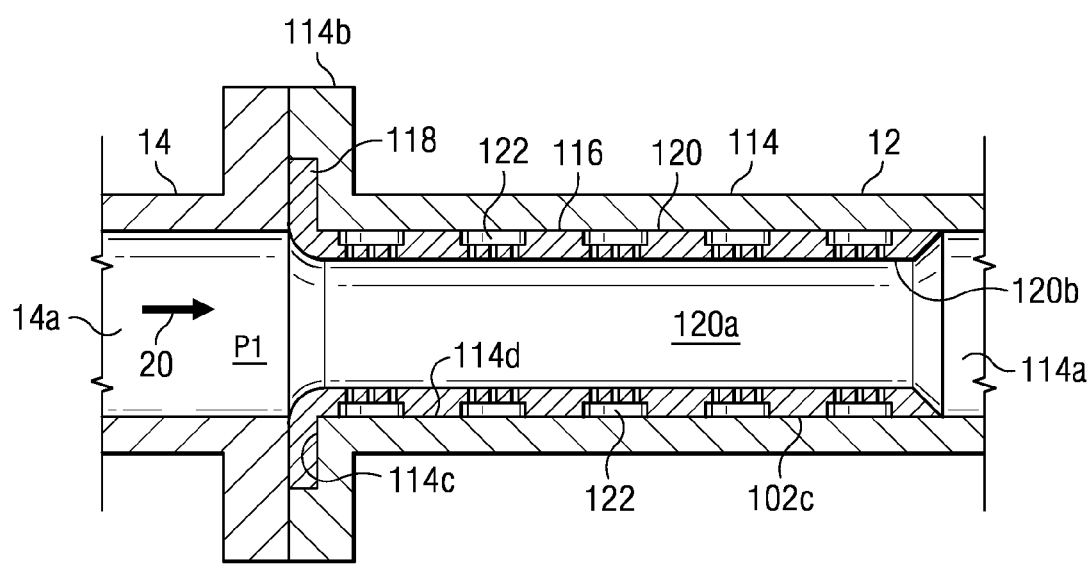
FIG. 5 illustrates a sectional view of an inlet of the fluid expansion device of FIG. 1, according to an exemplary embodiment.

In an exemplary embodiment, as illustrated in FIG. 5 with continuing reference to FIGS. 1, 4A and 4B, the fluid expansion device 12 includes an inlet 114 defining an internal passage 114*a* fluidicly coupled with the internal passage 14*a* defined by the conduit section 14. The inlet 114 includes a flange 114*b* and an external annular recess 114*c* formed in the face of the flange 114*b*, and further defines an inside surface 114*d*. A one-piece, unitary acoustic liner 116 extends within the inlet 114, and includes a flange 118 disposed in the external annular recess 114*c* so that the flange 118 is substantially flush with the flange 114*b*. The liner 116 further includes a cylindrical or annular member, or shell 120, defining an internal passage 120*a*, an inside surface 120*b*, and an outside surface 120*c*. The internal passage 120*a* is fluidicly coupled to each of the internal passage 14*a* of the conduit section 14 and the internal passage 114*a* of the inlet 114. A plurality of acoustic resonators 122 are formed in the shell 120. The resonators 122 are substantially similar to the resonators 108 and therefore will not be described in further detail. The inside surface 114*d* of the inlet 114 abuts the outside surface 120*c* of the shell 120, thereby capping the respective relatively large cells, or openings, of the resonators 122. Each of the relatively large cells of the resonators 122 is coupled to the internal passage 120*a* of the shell 120 by the relatively small cells of the respective resonator 122.

In an exemplary embodiment, the operation of the fluid expansion device 12 including the inlet 114 and the liner 116 is substantially similar to the above-described operation of the fluid expansion device 12 including the inlet 102 and the liner 104, with the fluid expansion device 12 generating acoustic energy and the liner 116 attenuating the acoustic energy. Therefore, the operation of the fluid expansion device 12 including the inlet 114 and the liner 116 will not be described in further detail.

In an exemplary embodiment, the fluid expansion device 12 includes an outlet (not shown) substantially similar to the inlet 114, and an acoustic liner substantially similar to the acoustic liner 116 engaging the outlet in a manner substantially similar to the manner by which the acoustic liner 116 engages the inlet 114, and attenuating acoustic energy in a manner substantially similar to the manner by which the acoustic liner 116 attenuates acoustic energy.

Figure 6:
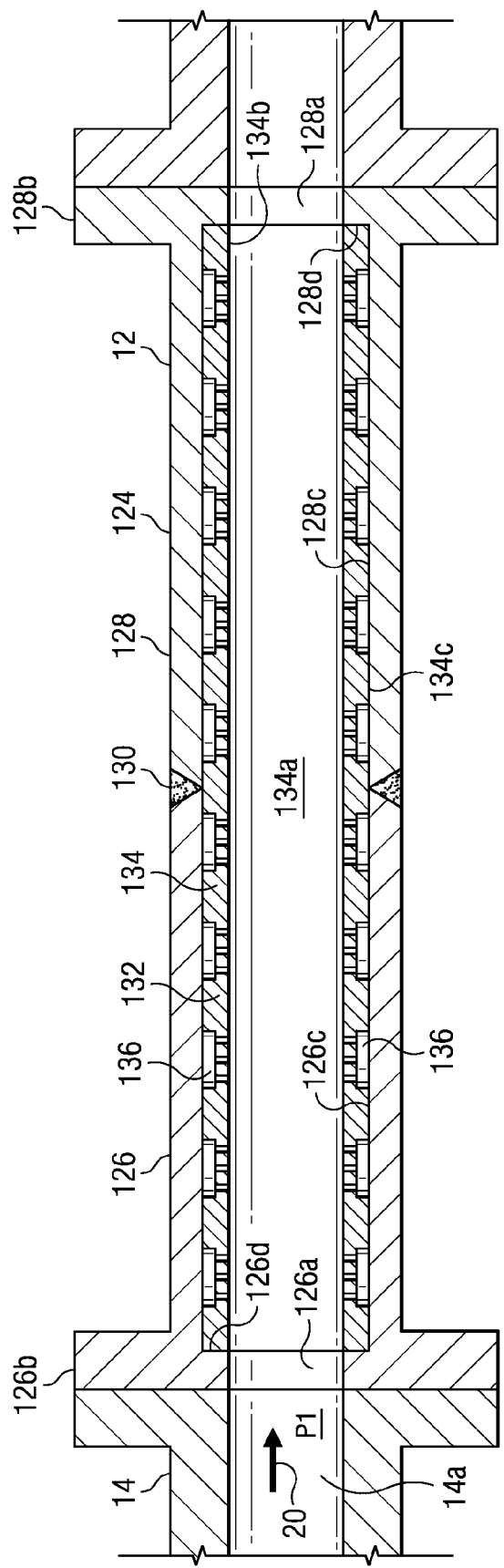
FIG. 6 illustrates a sectional view of an inlet of the fluid expansion device of FIG. 1, according to an exemplary embodiment.

In an exemplary embodiment, as illustrated in FIG. 6 with continuing reference to FIGS. 1, 4A and 4B, the fluid expansion device 12 includes an inlet 124 including tubular supports 126 and 128, which define fluidicly coupled internal passages 126*a* and 128, respectively, which, in turn, are fluidicly coupled to the internal passage 14*a* of the conduit 14. One end of the tubular support 126 includes a flange 126*b* and is coupled to the conduit 14, and the other end of the tubular support 126 is coupled to one end of the tubular support 128. In an exemplary embodiment, the tubular supports 126 and 128 are coupled by a weld joint 130. The other end of the tubular support 128 includes a flange 128*b* and is coupled to the remainder of the fluid expansion device 12. Internal annular recesses 126*c* and 128*c* are formed in the tubular supports 126 and 128, respectively. One end of the recess 126*c* defines an internal shoulder 126*d*, and the other end of the recess 126*c* is aligned with the end of the tubular support 126 coupled to the tubular support 128. Likewise, one end of the recess 128*c* defines an internal shoulder 128*d*, and the other end of the recess 128*c* is aligned with the end of the tubular support 128 coupled to the tubular support 126.

A one-piece, unitary acoustic liner 132 extends within the internal annular recesses 126*c* and 128*c* of the tubular supports 126 and 128, respectively, so that the respective opposing ends of the liner 132 abut or are at least relatively proximate the internal shoulders 126*d* and 128*d*, respectively. The liner 132 further includes a cylindrical or annular member, or shell 134, defining an internal passage 134*a*, an inside surface 134*b*, and an outside surface 134*c*. The internal passage 134*a* is fluidicly coupled to each of the internal passage 14*a* of the conduit section 14, the internal passage 126*a* of the tubular support 126, and the internal passage 128*a* of the tubular support 128. A plurality of acoustic resonators 136 are formed in the shell 134. The resonators 136 are substantially similar to the resonators 108 and therefore will not be described in further detail. The inside surfaces 126*c* and 128*c* abut the outside surface 134*c* of the shell 134, thereby capping the respective relatively large cells, or openings, of the resonators 136. Each of the relatively large cells of the resonators 136 is coupled to the internal passage 134*a* of the shell 134 by the relatively small cells of the respective resonator 136.

In an exemplary embodiment, the operation of the fluid expansion device 12 including the inlet 124 and the liner 132 is substantially similar to the above-described operation of the fluid expansion device 12 including the inlet 102 and the liner 104, with the fluid expansion device 12 generating acoustic energy and the liner 132 attenuating the acoustic energy. Therefore, the operation of the fluid expansion device 12 including the inlet 124 and the liner 132 will not be described in further detail.

In an exemplary embodiment, the fluid expansion device 12 includes an outlet (not shown) substantially similar to the inlet 124, and an acoustic liner substantially similar to the acoustic liner 132 engaging the outlet in a manner substantially similar to the manner by which the acoustic liner 132 engages the inlet 124, and attenuating acoustic energy in a manner substantially similar to the manner by which the acoustic liner 132 attenuates acoustic energy.

In several exemplary embodiments, in addition to the respective liners 104, 116 and 132, one or more other liners are engaged with the inlets 102, 114 and 124, respectively, which other liners are substantially similar to the liners 104, 116 and 132, respectively, and extend between the liners 104, 116, and 132, and inside surfaces of the inlets 102, 114 and 124, respectively.

Figure 7:
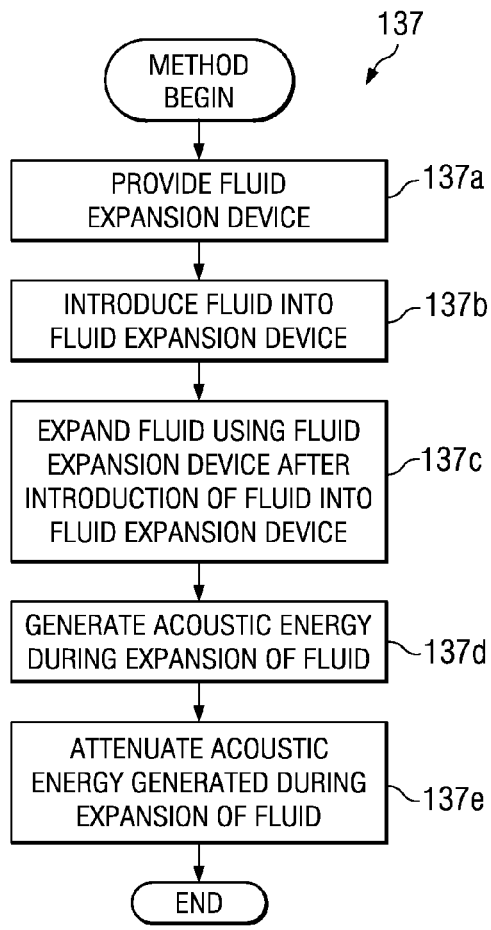
FIG. 7 illustrates a flow chart illustration of a method, according to an exemplary embodiment.

In an exemplary embodiment, as illustrated in FIG. 7 with continuing reference to FIGS. 1-6, a method is generally referred to by the reference numeral 137 and includes providing a fluid expansion device in step 137*a*, introducing fluid into the fluid expansion device in step 137*b*, expanding the fluid using the fluid expansion device in step 137*c* after the step 137*b*, generating acoustic energy in step 137*d* during the step 137*c*, and, in step 137*e*, attenuating the acoustic energy generated in the step 137*d*.

Figure 8:
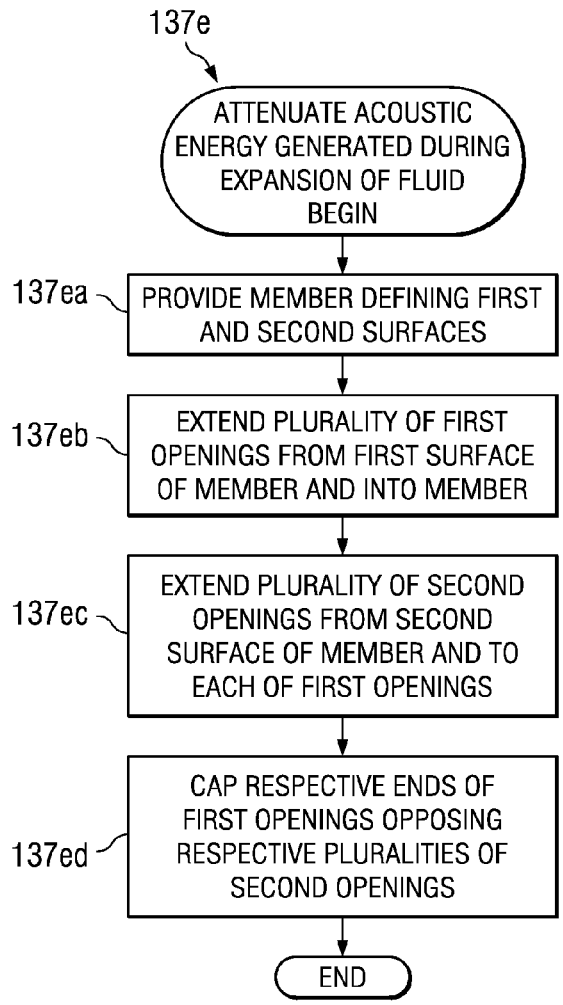
FIG. 8 illustrates a flow chart illustration of a step of the method of FIG. 7, according to an exemplary embodiment.

In an exemplary embodiment, as illustrated in FIG. 8 with continuing reference to FIG. 7, attenuating the acoustic energy in the step 137*e* of the method 137 includes providing a member defining first and second surfaces in step 137*ea*, extending a plurality of first openings from the first surface of the member and into the member in step 137*eb*, extending a plurality of second openings from the second surface of the member and to each of the first openings in step 137*ec*, and capping the respective ends of the first openings opposing respective pluralities of the second openings in step 137*ed*.

In an exemplary embodiment, as illustrated in FIG. 9 with continuing reference to FIGS. 1 and 6, a fluid-carrying conduit, such as, for example, a pipeline, is generally referred to by the reference numeral 138, and is adapted to transport pressurized fluid under conditions to be described below. The fluid-carrying conduit 138 is substantially similar to the inlet 124 shown in FIG. 6 and therefore will not be described in further detail. An acoustic liner 140 is engaged with the conduit 138. The acoustic liner 140 and its engagement with the conduit 138 are substantially similar to the acoustic liner 132 and its engagement with the inlet 124, respectively, and therefore the acoustic liner 140 and its engagement with the conduit 138 will not be described in further detail.

In operation, in an exemplary embodiment, the conduit 138 is coupled to one or more other conduits, components and/or systems through which a pressurized fluid, such as, for example, steam, is adapted to flow, and transports the pressurized fluid from one end of the conduit 138 to the other. The pressurized fluid enters the conduit 138 at a pressure P3, and exits the conduit 138 at a pressure P4, which is generally equal to the pressure P3, or is less than the pressure P3 due to any pressure loss associated with internal flow.

In an exemplary embodiment, during its operation, the conduit 138 is a noise source, and/or one or more components and/or systems upstream and/or downstream of the conduit 138 are noise sources, generating acoustic energy, or noise, and producing a noise level; the acoustic liner 140 attenuates the acoustic energy generated by these noise sources, thereby reducing the noise level. In several exemplary embodiments, the attenuation of the acoustic energy by the acoustic liner 140 reduces the risk of any structural failure due to vibrations and/or other types of dynamic and/or vibratory loading, within, relatively proximate, upstream of, and/or downstream of, the conduit 138. Moreover, the attenuation of acoustic energy by the acoustic liner 140 reduces the risk that the conduit 138, will become a noise nuisance.

In several exemplary embodiments, the length of the conduit 138 and thus the length of the acoustic liner 140 is varied in order to extend and couple the conduit to components and/or systems upstream and/or downstream of the conduit 138. In an exemplary embodiment, the conduit 14 is, includes, or is at least a part of the conduit 138 and includes the acoustic liner 140 engaged therewith. In an exemplary embodiment, the conduit 16 is, includes, or is at least a part of the conduit 138 and includes the acoustic liner 140 engaged therewith.

In an exemplary embodiment, as illustrated in FIG. 10 with continuing reference to FIGS. 1, 6 and 9, a fluid-carrying conduit, such as, for example, a pipeline, is generally referred to by the reference numeral 142 and includes a longitudinally-extending acoustic liner 144; a longitudinally-extending acoustic liner 146 coupled to and circumferentially extending about the acoustic liner 144; a longitudinally-extending skin 148 coupled to and circumferentially about the acoustic liner 146; a slip-on flange 150 coupled to and circumferentially extending about the acoustic liner 146, and substantially flush with aligned end portions of the acoustic liners 144 and 146; and a slip-on flange 152 coupled to and circumferentially extending about the acoustic liner 146, and substantially flush with the other aligned end portions of the acoustic liners 144 and 146. The skin 148 extends between, and is coupled to, the flanges 150 and 152. Each of the acoustic liners 144 and 146 is substantially similar to the acoustic liner 132 and therefore the liners 144 and 146 will not be described in detail. In an exemplary embodiment, the skin 148 includes ⅛" sheet aluminum.

In operation, in an exemplary embodiment, the conduit 142 is coupled to one or more other conduits, components and/or systems through which a pressurized fluid, such as, for example, steam, is adapted to flow, and transports the pressurized fluid from one end of the conduit 142 to the other. The pressurized fluid enters the conduit 142 at the pressure P3, and exits the conduit 142 at the pressure P4, which is generally equal to the pressure P3, or is less than the pressure P3 due to any pressure loss associated with internal flow. In an exemplary embodiment, the liners 144 and 146 form the majority of the conduit 142, providing the bulk of the structural integrity and/or rigidity of the conduit 142.

In an exemplary embodiment, during its operation, the conduit 142 is a noise source, and/or one or more components and/or systems upstream and/or downstream of the conduit 142 are noise sources, generating acoustic energy, or noise, and producing a noise level; the acoustic liners 144 and 146 attenuate the acoustic energy generated by these noise sources, thereby reducing the noise level. In an exemplary embodiment, the respective arrays of acoustic resonators in the liners 144 and 146 work collectively as an array of acoustic resonators in series to attenuate acoustic energy. In several exemplary embodiments, the attenuation of the acoustic energy by the acoustic liners 144 and 146 reduces the risk of any structural failure due to vibrations and/or other types of dynamic and/or vibratory loading, within, relatively proximate, upstream of, and/or downstream of, the conduit 142. Moreover, the attenuation of acoustic energy by the acoustic liners 144 and 146 reduces the risk that the conduit 142 will become a noise nuisance.

In several exemplary embodiments, the length of the conduit 142 is varied in order to couple the conduit 142 to components and/or systems positioned upstream and/or downstream of the conduit 142. In an exemplary embodiment, the conduit 14 is, includes, or is at least a part of the conduit 142. In an exemplary embodiment, the conduit 16 is, includes, or is at least a part of the conduit 142.

Figure 11:
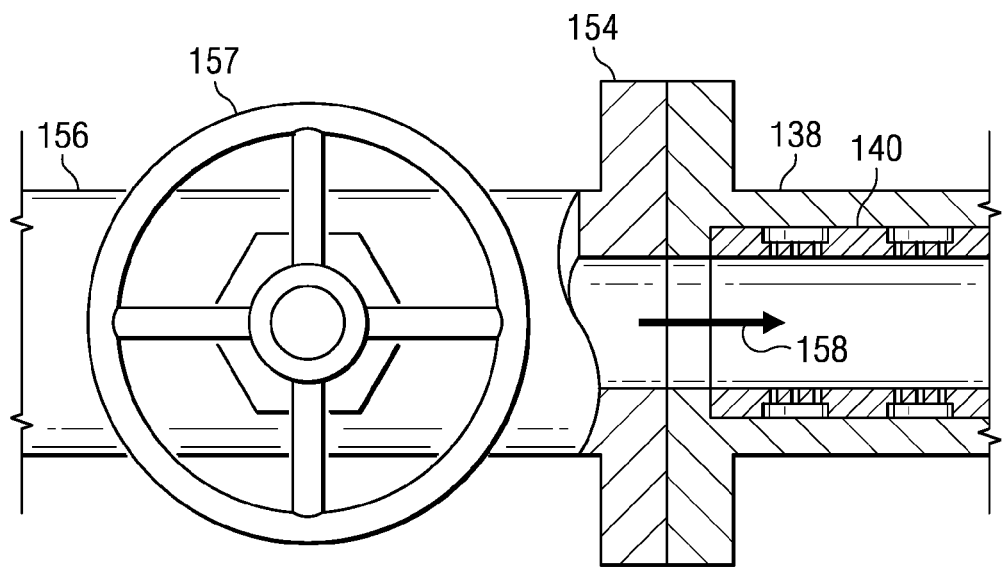
FIG. 11 illustrates a partial sectional/partial diagrammatic view of a system according to an exemplary embodiment, the system including a fluid carrying conduit and a flow control valve, according to respective exemplary embodiments.

In an exemplary embodiment, as illustrated in FIG. 11 with continuing reference to FIGS. 6 and 9, a system is generally referred to by the reference numeral 154 and includes the conduit 138, the acoustic liner 140, and a conduit section, such as, for example, a pipeline section, 156 coupled to the conduit 138. A flow device, such as, for example, valve 157, is coupled to the conduit section 156 in an in-line configuration and is adapted to control the flow of pressurized fluid through the conduit section 156 and the conduit 138. In operation, pressurized fluid flows through the conduit section 156 and the valve 157, and then through the conduit 138, as indicated by an arrow 158. In view of this flow direction, the valve 157 is positioned upstream of the conduit 138. As a result of the flow of pressurized fluid through the valve 157, the valve 157 is a noise source, with acoustic energy, or noise, being generated at least downstream of the valve 157. The acoustic liner 140 of the conduit 138 attenuates the acoustic energy generated by the valve 157, thereby reducing the noise level. In several exemplary embodiments, the attenuation of the acoustic energy by the acoustic liner 140 reduces the risk of any structural failure due to vibrations and/or other types of dynamic and/or vibratory loading. Moreover, the attenuation of acoustic energy by the acoustic liner 140 reduces the risk that the valve 157 will become a noise nuisance.

Figure 12:
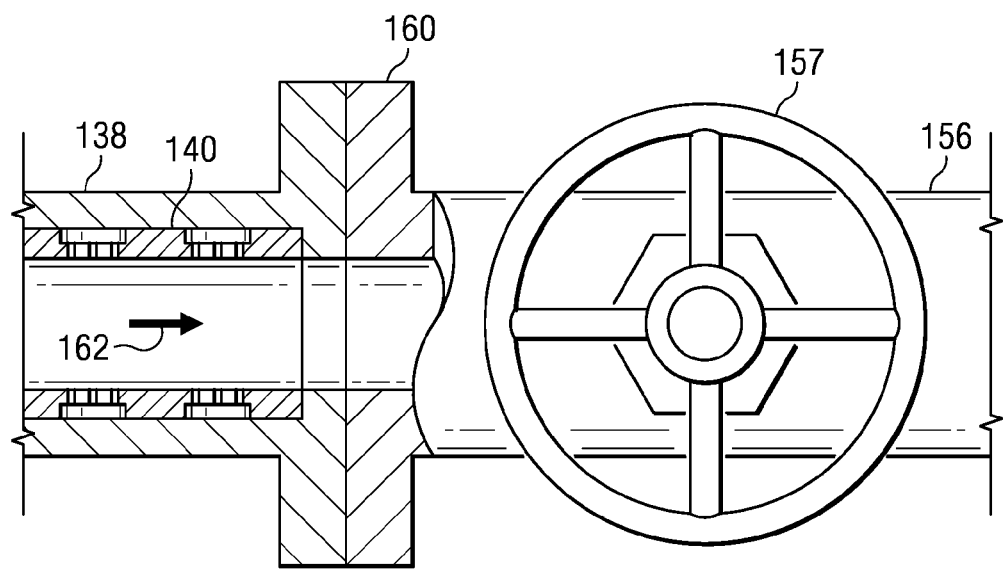
FIG. 12 illustrates a partial sectional/partial diagrammatic view of a system according to an exemplary embodiment, the system including a fluid carrying conduit and a flow device, according to respective exemplary embodiments.

In an exemplary embodiment, as illustrated in FIG. 12 with continuing reference to FIGS. 6, 9 and 11, a system is generally referred to by the reference numeral 160 and includes the conduit 138, the acoustic liner 140, and the conduit section 156 coupled to the conduit 138. The valve 157, is coupled to the conduit section 156 in an in-line configuration and is adapted to control the flow of pressurized fluid through the conduit 138 and the conduit section 156. In operation, pressurized fluid flows through the conduit 138, and then through the valve 157 and the conduit section 156, as indicated by an arrow 162. In view of this flow direction, the valve 157 is positioned downstream of the conduit 138. As a result of the flow of pressurized fluid through the valve 157, the valve 157 is a noise source, with acoustic energy, or noise, being generated at least upstream of the valve 157. The acoustic liner 140 of the conduit 138 attenuates the acoustic energy generated by the valve 157, thereby reducing the noise level. In several exemplary embodiments, the attenuation of the acoustic energy by the acoustic liner 140 reduces the risk of any structural failure due to vibrations and/or other types of dynamic and/or vibratory loading. Moreover, the attenuation of acoustic energy by the acoustic liner 140 reduces the risk that the valve 157 will become a noise nuisance.

In several exemplary embodiments, instead of, or in addition the valve 157, one or more other flow devices are coupled to the conduit section 156, such as, for example, one or more orifices or other aeroacoustic sources.

In an exemplary embodiment, as illustrated in FIG. 13 with continuing reference to FIGS. 4A and 4B, a system is generally referred to by the reference numeral 164 and includes a flow device, such as a valve assembly, 166 extending between conduit sections 168 and 170. The valve assembly 166 includes a housing 172 defining an internal passage 172a, and including an internal annular recess 172b formed in the inside wall of the housing 172, one end of which is aligned with an end of the housing 172, and an internal recess 172c formed in the inside wall of the housing 172, one end of which is aligned with the other end of the housing 172. A blocking element 174 is coupled to the housing 172 and is adapted to control fluid flow through the valve assembly 166. Acoustic liners 176 and 178 are disposed in the recesses 172b and 172c, respectively. Each of the liners 176 and 178 is substantially similar to the liner 104 and therefore will not be described in further detail. In several exemplary embodiments, an acoustic liner (not shown) is mounted to the blocking element 174, which liner includes a plate and/or a curved shell disposed in a recess formed in the blocking element 174, and an array of acoustic resonators formed in the plate and/or shell, the acoustic resonators being substantially similar to the acoustic resonators 108 in the liner 104. In operation, pressurized fluid flows through the valve assembly 166 and, as a result, the valve assembly 166 is a noise source, generating acoustic energy. One or more of the liners 176 and 178, and/or one or more other acoustic liners coupled to, and/or mounted within the valve assembly 166, attenuate the acoustic energy generated by the valve assembly 166, thereby reducing the noise level.

In an exemplary embodiment, as illustrated in FIG. 14 with continuing reference to FIGS. 1-13, a method is generally referred to by the reference numeral 180 and includes transporting a pressurized fluid through a conduit in step 180a, and, in step 180b, attenuating acoustic energy generated during the step 180a.

In an exemplary embodiment, as illustrated in FIG. 15 with continuing reference to FIG. 14, attenuating the acoustic energy in the step 180b of the method 180 includes providing a member defining first and second surfaces in step 180ba, extending a plurality of first openings from the first surface of the member and into the member in step 180bb, extending a plurality of second openings from the second surface of the member and to each of the first openings in step 180bc, and capping the respective ends of the first openings opposing respective pluralities of the second openings in step 180bd.

A fluid expansion device into which a fluid is adapted to enter at a first pressure, through which the fluid is adapted to flow, and from which the fluid is adapted to exit at a second pressure that is less than the first pressure, has been described that includes a stationary first member; a stationary second member defining first and second surfaces and including at least one of a ring, a curved shell, and a plate, the first member abutting the first surface of the second member; a plurality of first acoustic resonators, each of the first acoustic resonators including a first opening extending from the first surface defined by the second member, and into the second member; and a plurality of second openings, each of the second openings extending from the second surface, and to the first opening; the first member capping the end of the first opening opposing the second openings; wherein one or more of the first acoustic resonators attenuate acoustic energy generated during the flow of the fluid. In an exemplary embodiment, the first member includes at least one of an inlet, an outlet, and an annular section. In an exemplary embodiment, the first member includes the annular section; wherein the second member includes the ring, the ring defining the first and second surfaces, one of the ring and the annular section extending circumferentially about the other so that the annular section abuts the first surface of the ring and thereby caps the respective ends of the first openings opposing the respective pluralities of second openings; and wherein the fluid expansion device further includes a plurality of first blades extending from the second surface of the ring, each of the first blades defining a leading edge and a trailing edge; a rotatable wheel; and a plurality of second blades extending from the rotatable wheel; the first blades being stationary and directing the fluid to the second blades to thereby impel the wheel to rotate. In an exemplary embodiment, at least one first acoustic resonator in the plurality of first acoustic resonators is positioned between each pair of adjacent first blades in the plurality of first blades, and relatively proximate the respective trailing edges of the adjacent first blades. In an exemplary embodiment, the device includes another annular section; another ring defining third and fourth surfaces, one of the another annular section and the another ring extending circumferentially about the other so that the another annular section abuts the third surface of the another ring; a plurality of second acoustic resonators, each of the second acoustic resonators including a third opening extending from the third surface defined by the another ring, and into the another ring; and a plurality of fourth openings, each of the fourth openings extending from the fourth surface, and to the third opening; the another annular section capping the end of the third opening opposing the fourth openings; wherein one or more of the second acoustic resonators attenuate acoustic energy generated during the flow of the fluid; wherein the first blades extend between the rings; and wherein at least one second acoustic resonator in the plurality of second acoustic resonators is positioned between each pair of adjacent first blades in the plurality of first blades, and relatively proximate the respective trailing edges of the adjacent first blades. In an exemplary embodiment, each of the first blades defines a blade surface having a curvature; and wherein the plurality of first acoustic resonators includes a plurality of first groups of the first acoustic resonators, each of the first groups including a first series of the first acoustic resonators formed in the ring between each pair of adjacent first blades in the plurality of first blades, and along a path that generally conforms to at least the curvature of the blade surface defined by one of the first blades in the pair of adjacent first blades. In an exemplary embodiment, at least one first acoustic resonator in each of the first series of the first acoustic resonators is positioned at each of the following locations: relatively proximate the respective leading edges of the adjacent first blades; relatively proximate the respective trailing edges of the adjacent first blades; and between the respective leading and trailing edges of the adjacent first blades; the locations generally conforming to at least the curvature of the blade surface defined by the one of the first blades in the pair of adjacent first blades. In an exemplary embodiment, the device includes another annular section; another ring defining third and fourth surfaces, one of the another annular section and the another ring extending circumferentially about the other so that the another annular section abuts the third surface of the another ring; a plurality of second acoustic resonators, including a plurality of second groups of the second acoustic resonators, each of the second groups including a second series of the second acoustic resonators formed in the another ring; each of the second acoustic resonators including a third opening extending from the third surface defined by the another ring, and into the another ring; and a plurality of fourth openings, each of the fourth openings extending from the fourth surface, and to the third opening; the another annular section capping the end of the third opening opposing the fourth openings; wherein one or more of the second acoustic resonators attenuate acoustic energy generated during the flow of the fluid; wherein the first blades extend between the rings; and wherein at least one second acoustic resonator in each of the second series of the second acoustic resonators is positioned at each of the following locations: relatively proximate the respective leading edges of the adjacent first blades; relatively proximate the respective trailing edges of the adjacent first blades; and between the respective leading and trailing edges of the adjacent first blades; the locations generally conforming to at least the curvature of the blade surface defined by the one of the first blades in the pair of adjacent first blades. In an exemplary embodiment, the first member includes one of the inlet and the outlet, the one of the inlet and the outlet defining a curved inside surface; and wherein the second member includes the curved shell defining the first and second surfaces, the one of the inlet and the outlet extending circumferentially about the curved shell so that the curved inside surface abuts the first surface of the curved shell and thereby caps the respective ends of the first openings opposing the respective pluralities of second openings.

A steam turbine through which a fluid is adapted to flow has been described that includes a stationary first annular section; a stationary first ring defining first and second surfaces, one of the first ring and the first annular section extending circumferentially about the other so that the first annular section abuts the first surface of the first ring; a plurality of first acoustic resonators, each of the first acoustic resonators including a first opening extending from the first surface defined by the first ring, and into the first ring; and a plurality of second openings, each of the second openings extending from the second surface, and to the first opening; the first annular section capping the end of the first opening opposing the second openings; wherein one or more of the first acoustic resonators attenuate acoustic energy generated during the flow of the fluid; a plurality of first blades extending from the second surface of the ring, each of the first blades defining a leading edge and a trailing edge; a rotatable wheel; a plurality of second blades extending from the rotatable wheel, wherein the first blades are stationary and direct the fluid to the second blades to thereby impel the wheel to rotate; a stationary second annular section; a stationary second ring defining third and fourth surfaces, one of the second annular section and the second ring extending circumferentially about the other so that the second annular section abuts the third surface of the second ring; a plurality of second acoustic resonators, each of the second acoustic resonators including a third opening extending from the third surface defined by the second ring, and into the second ring; and a plurality of fourth openings, each of the fourth openings extending from the fourth surface, and to the third opening; the second annular section capping the end of the third opening opposing the fourth openings; wherein one or more of the second acoustic resonators attenuate acoustic energy generated during the flow of the fluid; wherein the first blades extend between the rings; wherein at least one first acoustic resonator in the plurality of first acoustic resonators is positioned between each pair of adjacent first blades in the plurality of first blades; and wherein at least one second acoustic resonator in the plurality of second acoustic resonators is positioned between each pair of adjacent first blades in the plurality of first blades.

A method has been described that includes providing a fluid expansion device; introducing a fluid into the fluid expansion device; expanding the fluid using the fluid expansion device after introducing the fluid into the fluid expansion device; generating acoustic energy during expanding the fluid; and attenuating the acoustic energy generated during expanding the fluid, including providing a first member defining first and second surfaces; extending a plurality of first openings from the first surface of the first member and into the first member; extending a plurality of second openings from the second surface of the first member and to each of the first openings; and capping the respective ends of the first openings opposing the respective pluralities of second openings with a surface defined by fluid expansion device. In an exemplary embodiment, the first member includes a ring; and wherein expanding the fluid using the fluid expansion device includes providing a rotatable wheel within the fluid expansion device; and impelling the wheel to rotate, including extending a plurality of first blades from the wheel; and directing the fluid to the first blades, including extending a plurality of second blades from the ring, each of the second blades defining a leading edge and a trailing edge; and permitting the fluid to flow between adjacent pairs of the second blades. In an exemplary embodiment, at least one plurality of second openings is positioned between each pair of adjacent second blades in the plurality of second blades, and relatively proximate the respective trailing edges of the adjacent second blades. In an exemplary embodiment, each of the second blades defines a blade surface having a curvature; and wherein a group of pluralities of second openings is positioned in a series between each pair of adjacent second blades in the plurality of second blades, the pluralities of second openings in the series being positioned along a path that generally conforms to at least the curvature of the blade surface defined by one of the second blades in the pair of adjacent second blades. In an exemplary embodiment, the fluid expansion device includes an inlet via which the fluid is introduced into the fluid expansion device, and an outlet via which the fluid exits the fluid expansion device; and wherein the first member includes a curved shell defining the first and second surfaces, one of the inlet and the outlet extending circumferentially about the curved shell so that the one of the inlet and the outlet abuts the first surface of the curved shell and thereby caps the respective ends of the first openings opposing the respective pluralities of second openings.

A system has been described that includes means for providing a fluid expansion device; means for introducing a fluid into the fluid expansion device; means for expanding the fluid using the fluid expansion device after introducing the fluid into the fluid expansion device; means for generating acoustic energy during expanding the fluid; and means for attenuating the acoustic energy generated during expanding the fluid, including means for providing a first member defining first and second surfaces; means for extending a plurality of first openings from the first surface of the first member and into the first member; means for extending a plurality of second openings from the second surface of the first member and to each of the first openings; and means for capping the respective ends of the first openings opposing the respective pluralities of second openings with a surface defined by fluid expansion device. In an exemplary embodiment, the first member includes a ring; and wherein means for expanding the fluid using the fluid expansion device includes means for providing a rotatable wheel within the fluid expansion device; and means for impelling the wheel to rotate, including means for extending a plurality of first blades from the wheel; and means for directing the fluid to the first blades, including means for extending a plurality of second blades from the ring, each of the second blades defining a leading edge and a trailing edge; and means for permitting the fluid to flow between adjacent pairs of the second blades. In an exemplary embodiment, at least one plurality of second openings is positioned between each pair of adjacent second blades in the plurality of second blades, and relatively proximate the respective trailing edges of the adjacent second blades. In an exemplary embodiment, each of the second blades defines a blade surface having a curvature; and wherein a group of pluralities of second openings is positioned in a series between each pair of adjacent second blades in the plurality of second blades, the pluralities of second openings in the series being positioned along a path that generally conforms to at least the curvature of the blade surface defined by one of the second blades in the pair of adjacent second blades. In an exemplary embodiment, the fluid expansion device includes an inlet via which the fluid is introduced into the fluid expansion device, and an outlet via which the fluid exits the fluid expansion device; and wherein the first member includes a curved shell defining the first and second surfaces, one of the inlet and the outlet extending circumferentially about the curved shell so that the one of the inlet and the outlet abuts the first surface of the curved shell and thereby caps the respective ends of the first openings opposing the respective pluralities of second openings.

A system has been described that includes a fluid expansion device; and a noise-attenuating array positioned proximate a source of generated noise in the fluid expansion device. In an exemplary embodiment, the fluid expansion device includes a steam turbine. In an exemplary embodiment, the array includes a plurality of acoustic resonators. In an exemplary embodiment, the array further includes a member defining first and second surfaces, the first surface abutting a portion of the fluid expansion device; and wherein each of the acoustic resonators includes a first opening extending from the first surface of the member and into the member; and a plurality of second openings, each of the second openings extending from the second surface of the member and to the first opening; wherein the abutment between the first surface of the member and the portion of the fluid expansion device caps the end of the first opening opposing the plurality of the second openings.

A method has been described that includes transporting pressurized fluid through a conduit; and attenuating acoustic energy generated during transporting the pressurized fluid through the conduit, including providing a first member defining first and second surfaces, and including one of a plate and a curved shell; extending a plurality of first openings from the first surface of the first member and into the first member; extending a plurality of second openings from the second surface of the first member and to each of the first openings; and capping respective ends of the first openings opposing the respective pluralities of second openings. In an exemplary embodiment, the first member includes the curved shell, the curved shell being cylindrical in shape; wherein the first and second surfaces are circumferentially-extending outside and inside surfaces, respectively, defined by the curved shell; wherein the conduit defines a cylindrical inside surface; wherein capping the respective ends of the first openings opposing the respective pluralities of second openings includes abutting the outside surface of the curved shell against the cylindrical inside surface of the conduit. In an exemplary embodiment, capping the respective ends of the first openings opposing the respective pluralities of second openings further includes forming an internal annular recess in the conduit, the internal annular recess defining the cylindrical inside surface of the conduit; and disposing the curved shell in the internal annular recess. In an exemplary embodiment, transporting the pressurized fluid through the conduit includes providing the conduit, including providing a first tubular support; and coupling an end of the first tubular support to an end of a second tubular support; wherein the first member includes the curved shell, the curved shell being cylindrical in shape; wherein the first and second surfaces are circumferentially-extending outside and inside surfaces, respectively, defined by the curved shell; and wherein capping the respective ends of the first openings opposing the respective pluralities of second openings includes forming an internal annular recess in each of the first and second tubular supports; and disposing the curved shell in the first and second internal annular recesses. In an exemplary embodiment, transporting the pressurized fluid through the conduit includes providing the conduit, including providing the first member, the first member including the curved shell, the curved shell being cylindrical in shape; providing a second member, the second member including another curved shell that extends circumferentially about the first-mentioned curved shell; and providing a skin, the skin circumferentially extending about the another curved shell; wherein capping the respective ends of the first openings opposing the respective pluralities of second openings includes abutting an inside surface defined by the another curved shell against an outside surface defined by the first-mentioned curved shell. In an exemplary embodiment, the method includes controlling the flow of the pressurized fluid upstream of, within, or downstream of, the conduit; wherein the acoustic energy is generated in response to controlling the flow of the pressurized fluid. In an exemplary embodiment, controlling the flow of the pressurized fluid includes fluidicly coupling a valve assembly to the conduit; and wherein capping the respective ends of the first openings opposing the respective pluralities of second openings includes abutting the first surface of the first member against a surface defined by the valve assembly.

A system has been described that includes means for transporting pressurized fluid through a conduit and generating acoustic energy upstream of, within, or downstream of, the conduit during transporting the pressurized fluid through the conduit; and means for attenuating the acoustic energy, including means for providing a first member defining first and second surfaces, and including one of a plate and a curved shell; means for extending a plurality of first openings from the first surface of the first member and into the first member; means for extending a plurality of second openings from the second surface of the first member and to each of the first openings; and means for capping the respective ends of the first openings opposing the respective pluralities of second openings. In an exemplary embodiment, the first member includes the curved shell, the curved shell being cylindrical in shape; wherein the first and second surfaces are circumferentially-extending outside and inside surfaces, respectively, defined by the curved shell; wherein the conduit defines a cylindrical inside surface; wherein means for capping the respective ends of the first openings opposing the respective pluralities of second openings includes means for abutting the outside surface of the curved shell against the cylindrical inside surface of the conduit. In an exemplary embodiment, means for capping the respective ends of the first openings opposing the respective pluralities of second openings further includes means for forming an internal annular recess in the conduit, the internal annular recess defining the cylindrical inside surface of the conduit; and means for disposing the curved shell in the internal annular recess. In an exemplary embodiment, means for transporting the pressurized fluid through the conduit includes means for providing the conduit, including means for providing a first tubular support; and means for coupling an end of the first tubular support to an end of a second tubular support; wherein the first member includes the curved shell, the curved shell being cylindrical in shape; wherein the first and second surfaces are circumferentially-extending outside and inside surfaces, respectively, defined by the curved shell; and wherein means for capping the respective ends of the first openings opposing the respective pluralities of second openings includes means for forming an internal annular recess in each of the first and second tubular supports; and means for disposing the curved shell in the first and second internal annular recesses. In an exemplary embodiment, means for transporting the pressurized fluid through the conduit includes means for providing the conduit, including means for providing the first member, the first member including the curved shell, the curved shell being cylindrical in shape; means for providing a second member, the second member including another curved shell that extends circumferentially about the first-mentioned curved shell; and means for providing a skin, the skin circumferentially extending about the another curved shell; wherein means for capping the respective ends of the first openings opposing the respective pluralities of second openings includes means for abutting an inside surface defined by the another curved shell against an outside surface defined by the first-mentioned curved shell. In an exemplary embodiment, the system includes means for controlling the flow of the pressurized fluid upstream of, within, or downstream of, the conduit; wherein the acoustic energy is generated in response to controlling the flow of the pressurized fluid. In an exemplary embodiment, means for controlling the flow of the pressurized fluid includes means for fluidicly coupling a valve assembly to the conduit; and wherein means for capping the respective ends of the first openings opposing the respective pluralities of second openings includes means for abutting the first surface of the first member against a surface defined by the valve assembly.

A system has been described that includes a conduit adapted to transport a pressurized fluid, the conduit defining a cylindrical inside surface; and an acoustic liner engaged with the conduit, the acoustic liner including a first cylindrical shell defining an inside surface and an outside surface, the outside surface of the first cylindrical shell abutting the cylindrical inside surface of the conduit; and a plurality of first acoustic resonators, each of the first acoustic resonators including a first opening extending from the outside surface of the first cylindrical shell, and into the first cylindrical shell; and a plurality of second openings, each of the second openings extending from the inside surface of the first cylindrical shell, and to the first opening; wherein the abutment between the outside surface of the first cylindrical shell and the cylindrical inside surface of the conduit caps the respective ends of the first openings opposing the respective pluralities of the second openings; and wherein one or more of the first acoustic resonators attenuate acoustic energy generated during the transport of the pressurized fluid by the conduit. In an exemplary embodiment, the conduit includes an internal annular recess defining the cylindrical surface of the conduit, one end of the internal annular recess defining an internal shoulder and the other end of the internal annular recess being aligned with an end of the conduit; wherein the first cylindrical shell is disposed in the internal annular recess, one end of the first cylindrical shell being at least proximate the internal shoulder and the other end of the first cylindrical shell being at least proximate the aligned ends of the internal annular recess and the conduit. In an exemplary embodiment, the conduit includes a first tubular support; and a second tubular support, an end of which is coupled to an end of the first tubular support, wherein each of the first and second tubular supports includes an internal annular recess, one end of the internal annular recess defining an internal shoulder and the other end being aligned with the end of the tubular support coupled to the other tubular support; wherein the respective internal annular recesses collectively define the cylindrical inside surface of the conduit; wherein the first cylindrical shell is disposed in the respective internal annular recesses of the first and second tubular supports, one end of the first cylindrical shell being at least proximate the internal shoulder of the first tubular support and the other end of the first cylindrical shell being at least proximate the internal shoulder of the second tubular support. In an exemplary embodiment, the conduit includes the first cylindrical shell; a second cylindrical shell circumferentially extending about the first cylindrical shell, the second cylindrical shell defining an outside surface and the cylindrical inside surface of the conduit; and a skin circumferentially extending about the second cylindrical shell; wherein the system further includes a plurality of second acoustic resonators, each of the second acoustic resonators including a third opening extending from the outside surface of the second cylindrical shell, and into the second cylindrical shell; and a plurality of fourth openings, each of the fourth openings extending from the cylindrical inside surface of the conduit defined by the second cylindrical shell, and to the third opening; wherein the skin abuts the outside surface of the second cylindrical shell to thereby cap the respective ends of the third openings opposing the respective pluralities of the fourth openings; and wherein one or more of the second acoustic resonators attenuate acoustic energy generated during the transport of the pressurized fluid by the conduit. In an exemplary embodiment, the system includes a flow device fluidicly coupled to the conduit and through which the pressurized fluid is adapted to flow; wherein acoustic energy is generated during the flow of the pressurized fluid through the flow device; and wherein one or more of the first acoustic resonators attenuate the acoustic energy generated during the flow of the pressurized fluid through the flow device. In an exemplary embodiment, the system includes one or more additional acoustic liners engaged with the flow device, each of the one or more additional acoustic liners including one of a plate and a shell, the one of the plate and the shell defining first and second surfaces; and a plurality of second acoustic resonators, each of the second acoustic resonators including a third opening extending from the first surface defined by the one of the plate and the shell, and into the one of the plate and the shell; and a plurality of fourth openings, each of the fourth openings extending from the second surface defined by the one of the plate and the shell, and to the third opening; the flow device capping the end of the third opening opposing the fourth openings.

A system has been described that includes a conduit for transporting pressurized fluid; and a noise-attenuating array engaged with the conduit. In an exemplary embodiment, the array includes a plurality of acoustic resonators. In an exemplary embodiment, the array further includes a member defining first and second surfaces, the first surface abutting the conduit; and wherein each of the acoustic resonators includes a first opening extending from the first surface of the member and into the member; and a plurality of second openings, each of the second openings extending from the second surface of the member and to the first opening; wherein the abutment between the first surface of the member and the conduit caps the end of the first opening opposing the plurality of the second openings.

It is understood that variations may be made in the foregoing without departing from the scope of the disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations. In the claims, means-plus-function clauses are intended to cover the structures described herein as performing the recited function and not only structural equivalents, but also equivalent structures.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for attenuating acoustic energy, comprising:
   a valve;
   a conduit coupled to the valve; and
   an acoustic liner disposed in the conduit and defining an acoustic resonator having a first bore extending from an outer surface of the acoustic liner toward an inner surface of the acoustic liner and a plurality of second bores extending from the inner surface to the first bore and in fluid communication therewith, wherein the acoustic resonator is sized to attenuate around a frequency of acoustic energy generated by the valve.

2. The apparatus of claim 1, wherein a length of at least one of the first bore and the plurality of second bores is varied to size the acoustic resonator.

3. The apparatus of claim 1, wherein a cross-sectional area of at least one of the first bore and the plurality of second bores is varied to size the acoustic resonator.

4. The apparatus of claim 1, wherein a volume of at least one of the first bore and the plurality of second bores is varied to size the acoustic resonator.

5. The apparatus of claim 1, wherein the number of the plurality of second bores is varied to size the acoustic resonator.

6. The apparatus of claim 1, wherein the conduit defines an internal annular recess, the acoustic liner being disposed in the internal annular recess.

7. An apparatus for attenuating acoustic energy, comprising:
   a conduit coupled to a valve and defining an internal annular recess; and
   a first acoustic liner disposed in the internal annular recess such that a flow of fluid through the conduit is unobstructed, the first acoustic liner defining a first acoustic resonator having a first bore extending from a first outer surface of the first acoustic liner toward a first inner surface of the first acoustic liner and a plurality of second bores extending from the first inner surface to the first bore, wherein the first acoustic resonator is sized to attenuate acoustic energy generated by the valve.

8. The apparatus of claim 7, wherein an inside surface of the conduit caps the first bore at the first outer surface.

9. The apparatus of claim 7, wherein the first acoustic liner is positioned downstream of the valve.

10. The apparatus of claim 7, wherein a first side of the internal annular recess defines an internal shoulder, and wherein a first end of the first acoustic liner abuts the internal shoulder.

11. The apparatus of claim 7, further comprising a second acoustic liner disposed radially outside the first acoustic liner and defining a second acoustic resonator having a third bore extending from a second outer surface of the second acoustic liner partially into the second acoustic liner and a plurality of fourth bores extending from a second inner surface of the second acoustic liner to the third bore and fluidly communicating therewith.

12. The apparatus of claim 11, wherein an inside surface of the conduit caps the third bore at the second outer surface.

13. The apparatus of claim 12, wherein the each of the plurality of fourth bores is in fluid communication with the first bore.

14. The apparatus of claim 11, further comprising a skin disposed radially outside the second acoustic liner, wherein the skin abuts the second outer surface of the second acoustic liner and caps the third bore.

15. The apparatus of claim 14, wherein the skin includes an aluminum sheet.

16. An apparatus for attenuating acoustic energy, comprising:
   a first conduit having first and second ends;
   a valve coupled to the first end in an in-line configuration, the valve adapted to control a flow of pressurized fluid through the first conduit;
   a second conduit having third and fourth ends, the third end coupled to the second end of the first conduit; and
   an acoustic liner disposed inside the first and second conduits and having an inner surface and an outer surface, the acoustic liner defining an acoustic resonator therein, the acoustic resonator including a first bore extending from the outer surface toward the inner surface and a plurality of second bores extending from the inner surface toward the outer surface such that each of the plurality of second bores is in communication with the first bore, wherein the acoustic resonator is sized to attenuate acoustic energy generated by the valve.

17. The apparatus of claim 16, wherein the first and second conduits are coupled by a weld joint.

18. The apparatus of claim 16, wherein a first internal shoulder in the first conduit defines a first side of a first internal recess and a second side of the first internal recess is aligned with the second end, and wherein a second internal shoulder in the second conduit defines a fourth side of a second internal recess and a third side of the second internal recess is aligned with the third end such that the first and second internal annular recesses form a single internal annular recess.

19. The apparatus of claim 18, wherein the acoustic liner is disposed in the single internal annular recess and a first acoustic liner end is disposed proximate the first internal shoulder and a second acoustic liner end is disposed proximate the second internal shoulder.

20. The apparatus of claim 19, wherein the first acoustic liner end abuts the first internal shoulder and the second acoustic liner end abuts the second internal shoulder.

* * * * *